United States Patent
Taherzadeh Boroujeni et al.

(10) Patent No.: US 12,328,775 B2
(45) Date of Patent: Jun. 10, 2025

(54) CRITERIA FOR PRACH REPETITION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Jelena Damnjanovic, Del Mar, CA (US); Peter Gaal, San Diego, CA (US); Junyi Li, Fairless Hills, PA (US); Juan Montojo, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 17/742,291

(22) Filed: May 11, 2022

(65) Prior Publication Data
US 2023/0037588 A1    Feb. 9, 2023

Related U.S. Application Data

(60) Provisional application No. 63/230,626, filed on Aug. 6, 2021.

(51) Int. Cl.
*H04W 74/0833* (2024.01)
*H04L 1/08* (2006.01)
(Continued)

(52) U.S. Cl.
CPC ........... *H04W 74/0841* (2013.01); *H04L 1/08* (2013.01); *H04W 24/08* (2013.01); *H04W 56/001* (2013.01); *H04W 74/006* (2013.01)

(58) Field of Classification Search
CPC ............ H04W 74/0841; H04W 24/08; H04W 56/001; H04W 74/006; H04L 1/08
(Continued)

(56) References Cited

U.S. PATENT DOCUMENTS

2019/0327767 A1    10/2019  Islam et al.
2022/0322454 A1*   10/2022  Choi .............. H04W 72/0446
(Continued)

FOREIGN PATENT DOCUMENTS

EP          3975651 A1    3/2022
WO    WO-2020263053 A1    12/2020

OTHER PUBLICATIONS

Ericsson: "On RAN2 Impacts for Coverage Enhancements and Type A PUSCH Repetitions for Msg3", 3GPP TSG-RAN WG2 #115-e, R2-2108273, 3rd Generation Partnership Project (3GPP), Mobile Competence Centre, 650, Route Des Lucioles, F-06921 Sophia-Antipolis Cedex, France, vol. RAN WG2, No. Electronic meeting, Aug. 16, 2021-Aug, 27, 2021, Aug. 5, 2021, XP052032516, pp. 1-9, On RAN2 Impacts for NR Coverage Enhancements and Type A PUSCH msg3 repetitions.docx the whole document.
(Continued)

*Primary Examiner* — Nicholas R Taylor
*Assistant Examiner* — Chong G Kim
(74) *Attorney, Agent, or Firm* — Holland & Hart LLP

(57) ABSTRACT

Methods, systems, and devices for wireless communications are described. The described techniques may enhance coverage by supporting repetitions of a random access request. A user equipment (UE) may receive, from a network entity, a synchronization signal block (SSB) message. The UE may measure the SSB message in order to determine signal metric, such as reference signal received power (RSRP). Based on the RSRP of the SSB, the UE may determine to transmit a set of repetitions of a random access request. The UE may then monitor a resource of a downlink control channel for a random access response from the network entity.

25 Claims, 16 Drawing Sheets

(51) Int. Cl.
*H04W 24/08* (2009.01)
*H04W 56/00* (2009.01)
*H04W 74/00* (2009.01)

(58) Field of Classification Search
USPC .......................................................... 370/329
See application file for complete search history.

(56) References Cited

U.S. PATENT DOCUMENTS

2024/0008050 A1* 1/2024 Zhou ................... H04W 56/001
2024/0023168 A1* 1/2024 Gao ....................... H04W 48/20
2024/0073719 A1* 2/2024 Ghosh ................... H04W 76/19

OTHER PUBLICATIONS

International Search Report and Written Opinion—PCT/US2022/030894—ISA/EPO—Aug. 19, 2022 (2106916WO).
Sony: "Coverage Enhancement for Initial access", 3GPP TSG RAN WG1#103e, R1-2008372, 3rd Generation Partnership Project (3GPP), Mobile Competence Centre, 650, Route Des Lucioles, F-06921 Sophia-Antipolis Cedex, France, vol. RAN WG1, No. E-meeting, Oct. 26-Nov. 13, 2020, Oct. 17, 2020, XP051940111, 6 Pages, the whole document.

* cited by examiner

CRITERIA FOR PRACH REPETITION

CROSS REFERENCE

The present Application for Patent claims the benefit of U.S. Provisional Patent Application No. 63/230,626 by TAHERZADEH BOROUJENI et al., entitled "CRITERIA FOR PRACH REPETITION," filed Aug. 6, 2021, assigned to the assignee hereof, and expressly incorporated by reference herein.

FIELD OF TECHNOLOGY

The following relates to wireless communications, including criteria for PRACH repetition.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities or one or more network access nodes, each simultaneously supporting communication for multiple communication devices, which may be otherwise known as user equipment (UE).

A UE may establish a connection with a network entity using a random access procedure, which may be an example of a two-step random access procedure, a three step random access procedure, or a four step random access procedure. In some examples, a UE may transmit, to the network entity, a random access request on a resource of a physical random access channel (PRACH). The UE may monitor for a random access response that may be used to establish the connection with the network entity.

SUMMARY

The described techniques relate to improved methods, systems, devices, and apparatuses that support criteria for PRACH repetition. Generally, the described techniques provide for enhancing coverage by supporting repetitions of a random access request. A user equipment (UE) may receive, from a network entity, a synchronization signal block (SSB) message. The UE may measure the SSB message in order to determine a signal metric, such as reference signal received power (RSRP). Based on the RSRP of the SSB, the UE may determine to transmit a set of repetitions of a random access request. The UE may then monitor a resource of a downlink control channel for a random access response from the network entity. By supporting the repetition of the random access request, the UE may increase the likelihood that the random access request is received by the network entity, thereby enhancing the coverage between the UE and the network entity.

A method for wireless communication at a user equipment (UE) is described. The method may include receiving, from a network entity, a synchronization signal block message, transmitting, to the network entity, a set of repetitions of a random access request based on a reference signal received power of the synchronization signal block message, and monitoring, based on transmitting the set of repetitions of the random access request, a resource of a downlink control channel for a random access response from the network entity.

An apparatus for wireless communication at a UE is described. The apparatus may include a processor, memory coupled with the processor, and instructions stored in the memory. The instructions may be executable by the processor to cause the apparatus to receive, from a network entity, a synchronization signal block message, transmit, to the network entity, a set of repetitions of a random access request based on a reference signal received power of the synchronization signal block message, and monitor, based on transmitting the set of repetitions of the random access request, a resource of a downlink control channel for a random access response from the network entity.

Another apparatus for wireless communication at a UE is described. The apparatus may include means for receiving, from a network entity, a synchronization signal block message, means for transmitting, to the network entity, a set of repetitions of a random access request based on a reference signal received power of the synchronization signal block message, and means for monitoring, based on transmitting the set of repetitions of the random access request, a resource of a downlink control channel for a random access response from the network entity.

A non-transitory computer-readable medium storing code for wireless communication at a UE is described. The code may include instructions executable by a processor to receive, from a network entity, a synchronization signal block message, transmit, to the network entity, a set of repetitions of a random access request based on a reference signal received power of the synchronization signal block message, and monitor, based on transmitting the set of repetitions of the random access request, a resource of a downlink control channel for a random access response from the network entity.

In some examples of the method, apparatuses, and non-transitory computer-readable medium described herein, transmitting the set of repetitions of the random access request may include operations, features, means, or instructions for transmitting the set of repetitions of the random access request based on the reference signal received power of the synchronization signal block message being below a reference signal received power threshold.

In some examples of the method, apparatuses, and non-transitory computer-readable medium described herein, receiving the synchronization signal block message may include operations, features, means, or instructions for receiving the synchronization signal block message that includes system information that indicates the reference signal received power threshold.

In some examples of the method, apparatuses, and non-transitory computer-readable medium described herein, the system information that indicates the reference signal received power threshold may be remaining minimum system information (RMSI) or other system information (OSI).

In some examples of the method, apparatuses, and non-transitory computer-readable medium described herein, receiving the synchronization signal block message may include operations, features, means, or instructions for receiving the synchronization signal block message that includes system information that indicates a second reference signal received power threshold, where the reference signal received power threshold may be based on the second reference signal received power threshold indicated by the system information and a power capability of the UE.

In some examples of the method, apparatuses, and non-transitory computer-readable medium described herein, receiving the synchronization signal block message may include operations, features, means, or instructions for receiving the synchronization signal block message that includes system information that indicates a second reference signal received power threshold corresponding to repetition of a scheduled uplink transmission, where the reference signal received power threshold may be based on the second reference signal received power threshold indicated by the system information.

In some examples of the method, apparatuses, and non-transitory computer-readable medium described herein, receiving the synchronization signal block message may include operations, features, means, or instructions for receiving the system information that indicates an offset that may be used to determine the reference signal received power relative to the second reference signal received power threshold indicated by the system information.

Some examples of the method, apparatuses, and non-transitory computer-readable medium described herein may further include operations, features, means, or instructions for determining an offset based on a random access request format, a random access request frequency range, a random access frequency band, a subcarrier spacing associated with the random access request, or a combination thereof, where the reference signal received power threshold may be determined relative to the second reference signal received power threshold using the determined offset.

Some examples of the method, apparatuses, and non-transitory computer-readable medium described herein may further include operations, features, means, or instructions for determining the reference signal received power threshold based on a number of failed access requests prior to transmission of the set of repetitions of the random access request.

Some examples of the method, apparatuses, and non-transitory computer-readable medium described herein may further include operations, features, means, or instructions for increasing the reference signal received power threshold by an increment value in response to a failed access request.

Some examples of the method, apparatuses, and non-transitory computer-readable medium described herein may further include operations, features, means, or instructions for determining the increment value based at least in part on system information included in the synchronization signal block message, an operating frequency range, an operating frequency band, a subcarrier spacing, a random access channel format, or a combination thereof.

Some examples of the method, apparatuses, and non-transitory computer-readable medium described herein may further include operations, features, means, or instructions for determining that the reference signal received power threshold may be different from a second reference signal received power threshold that may be used to determine whether to transmit a repetition of a scheduled uplink transmission in response to the received random access response.

Some examples of the method, apparatuses, and non-transitory computer-readable medium described herein may further include operations, features, means, or instructions for determining that the reference signal received power threshold based on a random access request configuration.

Some examples of the method, apparatuses, and non-transitory computer-readable medium described herein may further include operations, features, means, or instructions for determining that the reference signal received power threshold corresponds to a first of a contention free random access procedure or a contention based random access procedure and that a different threshold may be used for a second of the contention free random access procedure and the contention based random access procedure.

Some examples of the method, apparatuses, and non-transitory computer-readable medium described herein may further include operations, features, means, or instructions for determining the reference signal received power threshold based on a delay constraint for communications between the UE and the network entity, quality of service requirements between the UE and the network entity, a type of the UE, an application type, or a combination thereof.

Some examples of the method, apparatuses, and non-transitory computer-readable medium described herein may further include operations, features, means, or instructions for determining the reference signal received power threshold based on an operating frequency of the UE, a current random access channel occasion, or both.

In some examples of the method, apparatuses, and non-transitory computer-readable medium described herein, transmitting the set of repetitions of the random access request may include operations, features, means, or instructions for transmitting a number of repetitions of the random access request that may be based on a maximum transmission power of the UE, a number of prior failed random access requests, or both.

Some examples of the method, apparatuses, and non-transitory computer-readable medium described herein may further include operations, features, means, or instructions for transmitting the set of repetitions according to a condition based random access procedure, where the UE performs a contention free random access procedure using signaling separate from the synchronization signal block message.

A method for wireless communications at a network entity is described. The method may include transmitting, to a UE, synchronization signal block message, receiving, from the UE, a set of repetitions of a random access request based on transmitting the synchronization signal block message, and transmitting, to the UE, a random access response that is based on the set of repetitions of the random access request received from the UE.

An apparatus for wireless communications at a network entity is described. The apparatus may include a processor, memory coupled with the processor, and instructions stored in the memory. The instructions may be executable by the processor to cause the apparatus to transmit, to a UE, synchronization signal block message, receive, from the UE, a set of repetitions of a random access request based on transmitting the synchronization signal block message, and transmit, to the UE, a random access response that is based on the set of repetitions of the random access request received from the UE.

Another apparatus for wireless communications at a network entity is described. The apparatus may include means for transmitting, to a UE, synchronization signal block message, means for receiving, from the UE, a set of repetitions of a random access request based on transmitting the synchronization signal block message, and means for transmitting, to the UE, a random access response that is based on the set of repetitions of the random access request received from the UE.

A non-transitory computer-readable medium storing code for wireless communications at a network entity is described. The code may include instructions executable by a processor to transmit, to a UE, synchronization signal block message, receive, from the UE, a set of repetitions of a random access request based on transmitting the synchronization signal block message, and transmit, to the UE, a random access response that is based on the set of repetitions of the random access request received from the UE.

In some examples of the method, apparatuses, and non-transitory computer-readable medium described herein, transmitting the synchronization signal block message may include operations, features, means, or instructions for transmitting the synchronization signal block message that includes system information that indicates a reference signal received power threshold that may be to be used, by the UE, for determining whether to transmit the set of repetitions of the random access request.

In some examples of the method, apparatuses, and non-transitory computer-readable medium described herein, the system information that indicates the reference signal received power threshold may be remaining minimum system information (RMSI) or other system information (OSI).

Some examples of the method, apparatuses, and non-transitory computer-readable medium described herein may further include operations, features, means, or instructions for determining that the reference signal received power threshold may be different from a second reference signal received power threshold that may be used to determine whether to transmit a repetition of a scheduled uplink transmission in response to the received random access response.

Some examples of the method, apparatuses, and non-transitory computer-readable medium described herein may further include operations, features, means, or instructions for determining that the reference signal received power threshold based on a random access request configuration.

Some examples of the method, apparatuses, and non-transitory computer-readable medium described herein may further include operations, features, means, or instructions for determining that the reference signal received power threshold corresponds to a first of a contention free random access procedure or a contention based random access procedure and that a different threshold may be used for a second of the contention free random access procedure and the contention based random access procedure.

Some examples of the method, apparatuses, and non-transitory computer-readable medium described herein may further include operations, features, means, or instructions for determining the reference signal received power threshold based on a delay constraint for communications between the UE and the network entity, quality of service requirements between the UE and the network entity, a type of the UE, an application type, or a combination thereof.

Some examples of the method, apparatuses, and non-transitory computer-readable medium described herein may further include operations, features, means, or instructions for transmitting the synchronization signal block message that indicates an increment value that the UE is to apply to the reference signal received power threshold in response to a failed access request.

In some examples of the method, apparatuses, and non-transitory computer-readable medium described herein, transmitting the synchronization signal block message may include operations, features, means, or instructions for transmitting the synchronization signal block message that includes system information that indicates a first reference signal received power threshold that may be to be used, by the UE, for determining whether to transmit a set of repetitions of the random access request and may be used for determining a second reference signal received power threshold to be used for determining to transmit the set of repetitions of the random access request.

In some examples of the method, apparatuses, and non-transitory computer-readable medium described herein, transmitting the synchronization signal block message may include operations, features, means, or instructions for transmitting the synchronization signal block message that includes system information that indicates an offset in addition to the first reference signal received power threshold, where the offset may be used to determine the second reference signal received power threshold relative to the first reference signal received power threshold.

DETAILED DESCRIPTION

Figure 1:
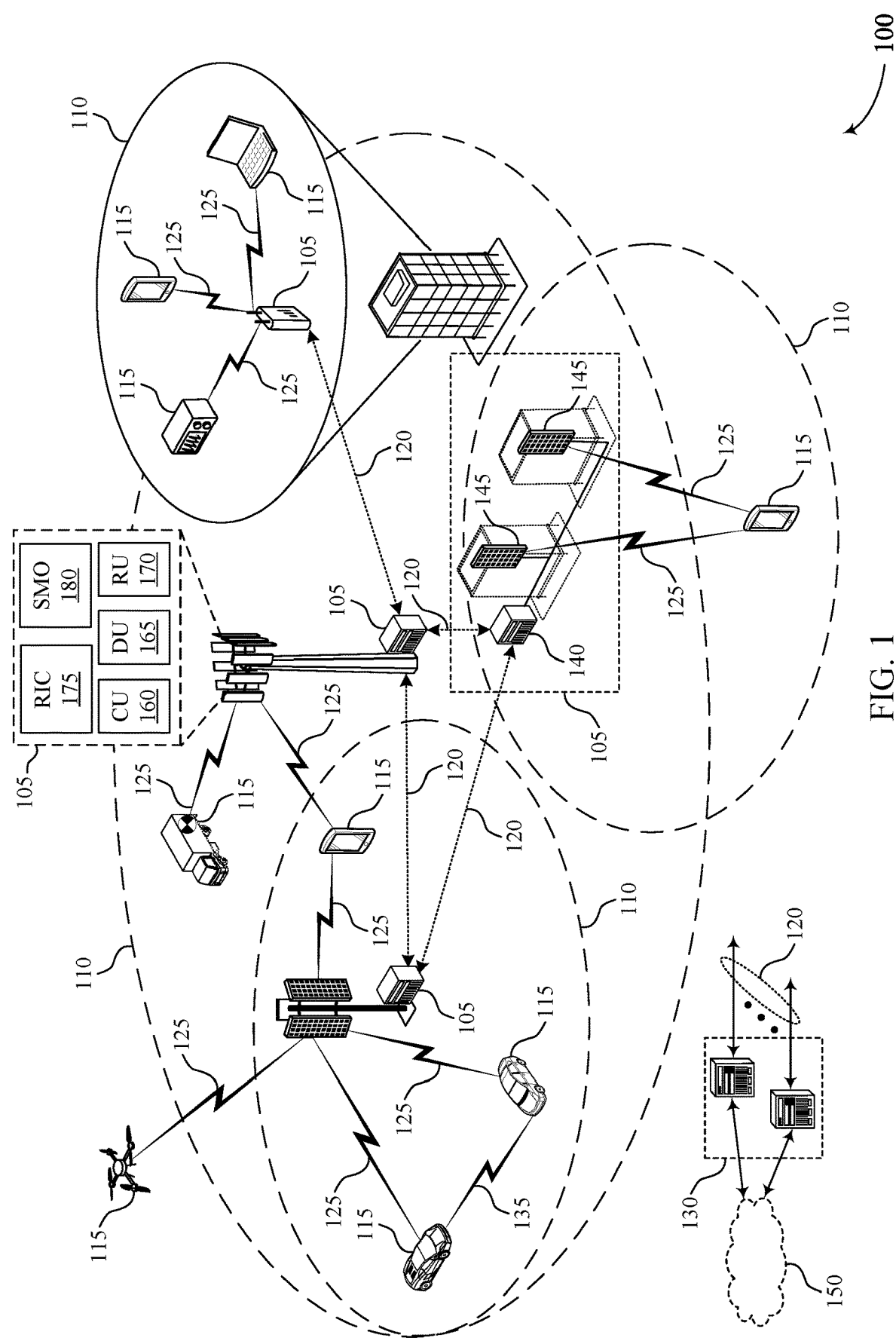
FIG. 1 illustrates an example of a wireless communications system that supports criteria for PRACH repetition in accordance with aspects of the present disclosure.

In a wireless communications system, a user equipment (UE) may establish a connection with a network entity using a random access procedure, which may be an example of a two-step random access procedure, a three-step random access procedure, or a four-step random access procedure. In some examples, a UE may transmit, to the network entity, a random access request on a resource of a physical random access channel (PRACH). In some examples, the random access request may be referred to as a PRACH message. The UE may monitor a downlink resource for a random access response that may be used to establish the connection with the network entity.

Some wireless communications systems may support repetitions of various transmissions, such as physical uplink shared channel (PUSCH) repetitions, physical uplink control channel (PUCCH) repetitions, or the like. Repetitions of a message may increase the likelihood that the message is received by a receiving device, such as a network entity. Thus, these techniques may support increased reliability and efficiencies in a wireless communications system, thereby enhancing coverage.

Techniques described herein provide for enhancing coverage by supporting repetitions of a random access request of a random access procedure. A UE may receive, from a network entity, a synchronization signal block (SSB) message. The UE may measure the SSB message in order to determine a signal metric, such as reference signal received power (RSRP). Based on the RSRP of the SSB, the UE may determine to transmit a set of repetitions of a random access request. The UE may then monitor a resource of a downlink control channel for a random access response from the network entity. By supporting the repetition of the random access request, the UE may increase the likelihood that the random access request is received by the network entity, thereby enhancing the coverage between the UE and the network entity.

In some examples, the SSB message may include system information, such as remaining minimum system information (RMSI) or other system information (OSI), that indicates a threshold that the UE is to use for determining whether to transmit a set of repetitions or transmit a single repetition. If the RSRP of the SSB is below the threshold (e.g., indicated via the SSB), then the UE may determine to transmit the set of repetitions (e.g., in order to account for power limitations). Contrarily, if the RSRP of the SSB is above the threshold, then the UE may determine to transmit a single random access request (e.g., not transmit the set of repetitions of the PRACH message). The UE may also consider other aspects, such as power capability of the UE, current resources, offsets relative to other threshold, etc., when determining or applying the threshold for SSB RSRP.

Aspects of the disclosure are initially described in the context of wireless communications systems. Aspects of the disclosure are further described with reference to an example wireless communications system environment, a resource diagram, and a process flow diagram. Aspects of the disclosure are further illustrated by and described with reference to apparatus diagrams, system diagrams, and flowcharts that relate to criteria for PRACH repetition.

FIG. 1 illustrates an example of a wireless communications system 100 that supports criteria for PRACH repetition in accordance with aspects of the present disclosure. The wireless communications system 100 may include one or more network entities 105 (e.g., one or more base stations), one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The network entities 105 may be dispersed throughout a geographic area to form the wireless communications system 100 and may be devices in different forms or having different capabilities. The network entities 105 and the UEs 115 may wirelessly communicate via one or more communication links 125. Each network entity 105 may provide a coverage area 110 over which the UEs 115 and the network entity 105 may establish one or more communication links 125. The coverage area 110 may be an example of a geographic area over which a network entity 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network entities 105, or network equipment (e.g., core network nodes, relay devices, integrated access and backhaul (IAB) nodes, or other network equipment), as shown in FIG. 1.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

One or more of the network entities 105 described herein may include or may be referred to by a person having ordinary skill in the art as a base transceiver station, a radio network entity, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay network entities, among other examples, as shown in FIG. 1.

The UEs 115 and the network entities 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a network entity 105, or downlink transmissions from a network entity 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 may be movable and therefore provide communication coverage for a moving geographic coverage area 110. In some examples, different geographic coverage areas 110 associated with different technologies may overlap, but the different geographic coverage areas 110 may be supported by the same network entity 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

The wireless communications system 100 may support synchronous or asynchronous operation. For synchronous operation, the network entities 105 may have similar frame timings, and transmissions from different network entities 105 may be approximately aligned in time. For asynchronous operation, the network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity 105. Other UEs 115 in such a group may be outside the geographic coverage area 110 of a network entity 105 or be otherwise unable to receive transmissions from a network entity 105. In some examples, groups of the UEs 115 communicating via D2D communications may utilize a one-to-many (1:M) system in which each UE 115 transmits to every other UE 115 in the group. In some examples, a network entity 105 facilitates the scheduling of resources for D2D communications. In other cases, D2D communications are carried out between the UEs 115 without the involvement of a network entity 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network entity 105 may be distributed across various network devices (e.g., radio heads and ANCs) or consolidated into a single network device (e.g., a network entity 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more network entity antennas or antenna arrays may be co-located at an antenna assembly, such as an antenna tower. In some examples, antennas or antenna arrays associated with a network entity 105 may be located in diverse geographic locations. A network entity 105 may have an antenna array with a number of rows and columns of antenna ports that the network entity 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beam forming operations. For example, a network entity 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times in different directions. For example, the network entity 105 may transmit a signal according to different beamforming weight sets associated with different directions of transmission. Transmissions in different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a network entity 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network entity 105 in different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or radio frequency beamforming to generate a combined beam for transmission (e.g., from a network entity 105 to a UE 115). The UE 115 may report feedback that indicates precoding weights for one or more beam directions, and the feedback may correspond to a configured number of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a network entity 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network entity 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a network entity 105 or a core network 130 supporting radio bearers for user plane data. At the physical layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may establish a connection with the network entity 105 using a random access procedure. In accordance with the procedure, the UE 115 may transmit a random access request (e.g., a PRACH message) to the network entity 105. The random access request may be referred to as message 1 (Msg1) in the random access procedure. In response to the random access request, the UE 115 may receive a random access response from the network entity. The random access response may be referred to as Msg2 in the random access procedure. The random access response may be used by the UE 115 to transmit a request for a radio resource control (RRC) connection, which may be referred to as Msg3, in the random access procedure.

Techniques described herein provide for a UE 115 transmitting a repetition of a random access request (e.g., PRACH message or Msg1) based on various criteria, such as RSRP of a received SSB, power capability of the UE, or a combination thereof. In some examples, the RSRP of the received SSB is compared to a RSRP threshold in order to determine whether to transmit repetition of the random access request. The threshold may be configured via SSB, configured relative to another threshold, determined by the UE 115, or a combination thereof. By supporting repetition of the random access request in a random access procedure, the UE 115 may increase the likelihood that the network entity receives the random access request, which may improve reliability and efficiency in the wireless communications system 100.

Figure 2:
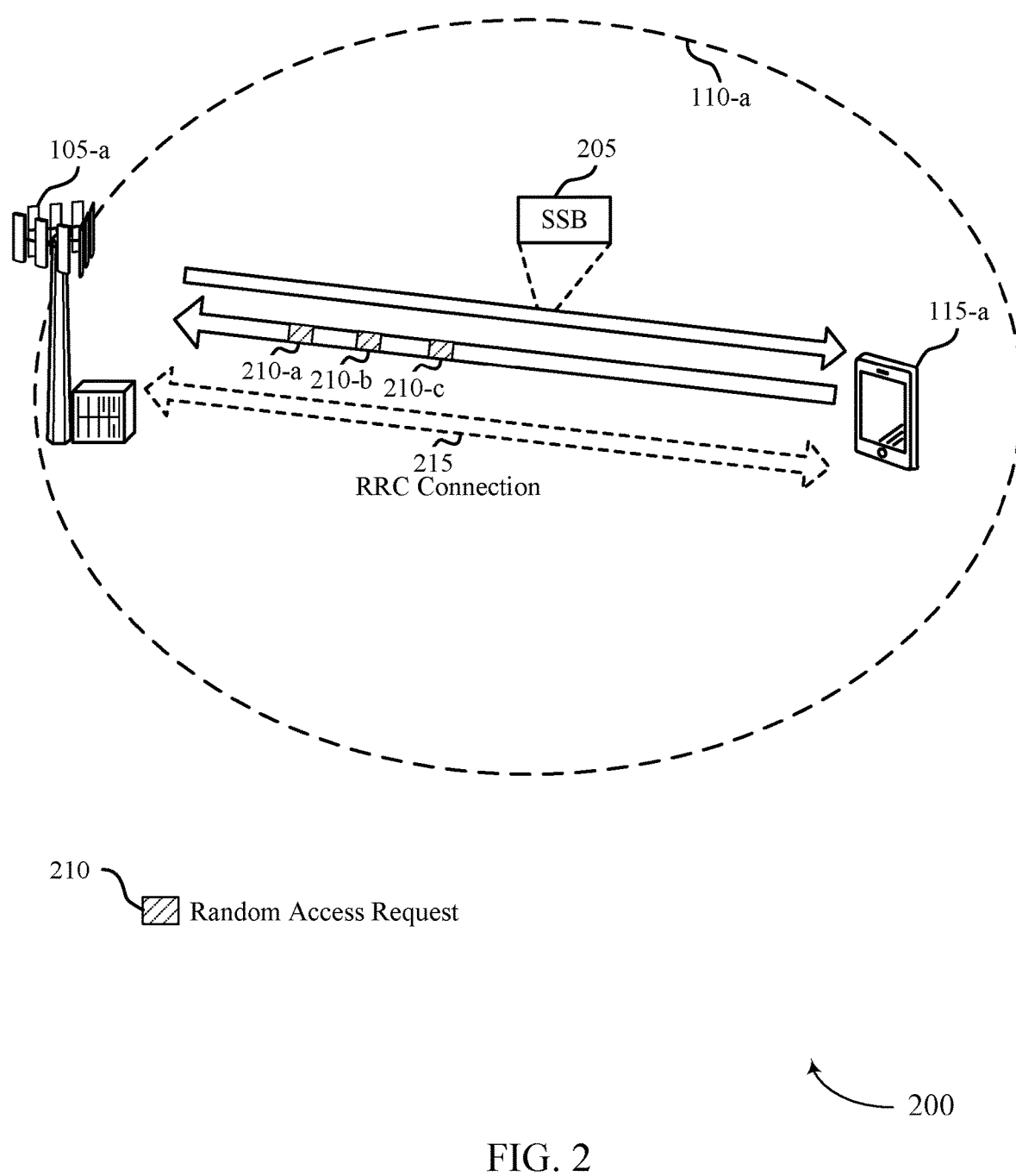
FIG. 2 illustrates an example of a wireless communications system that supports criteria for PRACH repetition in accordance with aspects of the present disclosure.

FIG. 2 illustrates an example of a wireless communications system 200 that supports criteria for PRACH repetition in accordance with aspects of the present disclosure. The wireless communications system 200 may include or implement aspects of wireless communications system 100 of FIG. 1. For example, the wireless communications system 200 may include a network entity 105-*a* and a UE 115-*a*, which may be examples of the network entity 105 and the UE 115 of FIG. 1. FIG. 2 illustrates examples of various communications between the UE 115-*a* and the network entity 105-*a* that may be used to establish a connection, such as RRC connection 215. The network entity 105-*a* may communicate with various UEs 115 in a coverage area 110-*a* supported by the network entity 105-*a* and using the techniques described herein.

The network entity 105-*a* may periodically transmit an SSB message 205 that may be used by UEs 115, such as UE 115-*a*, to synchronize and establish a connection with the network (e.g., the network entity 105-*a*). The location (e.g., time and frequency resources) and periodicity of the SSB message 205 may be dependent on a subcarrier spacing that is being used in the cell supported by the network entity 105-*a*. The SSB message 205 may include various signals and information. For example, the SSB message 205 may include a primary synchronization signal (PSS) and a secondary synchronization signal (SSS). Additionally, the SSB message 205 may be associated with or include a physical broadcast channel (PBCH). The PBCH may carry a master information block (MIB), which includes various system information. For example, the MIB may indicate a location of a system information block (SIB) type 1 (SIB-1) message. The MIB and/or SIB-1 may also indicate locations of other system information, such as other SIBs. Additionally, the MIB and/or SIBs may correspond to minimum system information (MSI), RMSI, and OSI.

The UE 115-*a* may use information included in the system information to identify resources for a random access procedure. A random access procedure may be a two-step random access procedure (e.g., 2-step RACH), a three step random access procedure, (3-step RACH), or a four-step random access procedure (e.g., 4-step RACH). It should be understood that the techniques described herein may be applicable to other types of random access procedures. Further, the techniques described herein may be applicable to a contention based random access (CBRA) or a contention free random access (CFRA). In accordance with the four-step random access procedure, the UE 115-*a* may transmit a random access request 210 to the network entity 105-*a*. The UE 115-*a* may select and transmit a preamble as a part of the random access request (e.g., Msg1) to the network entity 105-*a*.

If the network entity 105-*a* receives the random access request with the preamble, the network entity 105-*a* may transmit a random access response (e.g., over a physical downlink shared channel (PDSCH) and/or PDCCH). The random access response (e.g., Msg2) may include information that that the UE 115-*a* may use for establishing a connection. The UE 115-*a* may then transmit uplink scheduling information over a resource of a physical uplink shared channel (PUSCH). This message, which may be referred to as Msg3, may be a scheduled uplink transmission, and may include various information or parameters. The network entity 105-*a* may respond to the Msg3 with a Msg4 which may be a RRC connection/contention resolution message. As a result, the UE 115-*a* and the network entity 105-*a* may establish a connection, such as RRC connection 215. The network entity 105-*a* and/or the UE 115-*a* may perform various procedures for contention resolution. In some examples, the UE 115-*a* may restart the procedure by transmitting another random access request 210. For example, if the random access procedure fails, then the UE 115-*a* may restart the procedure by transmitting another random access request 210.

Techniques described herein may support increased reliability and efficiency in the wireless communications system 200 by supporting random access request 210 repetition based on various criteria. For example, the UE 115-*a* may use PRACH repetition (e.g., Msg1 or random access request repetition) based on criteria that may depend on the RSRP of the SSB message 205 and/or the UE power class. By transmitting repetitions of the random access request 210 based on criteria, the UE 115-*a* may increase the likelihood of successful receipt of the random access request 210 at the network entity 105-*a* during some scenarios when a single random access request 210 may not be adequate (e.g., due to pathloss).

In one example, the network entity 105-*a* may configure a threshold for SSB based RSRP via RMSI or OSI. The threshold may be modified by a correcting term (e.g., an offset value) depending on the UE power class. In some examples, the correcting term or offset may be configured or predefined for each power class of UEs 115 (e.g., up to each power class of UE may apply a different offset to determine the threshold). The UE may receive the SSB message 205 and measure a characteristic of the SSB message 205, such as the RSRP. The SSB may indicate information (e.g., in RMSI or OMSI) that includes the threshold that the UE 115-*a* is to use to determine whether to perform PRACH repetition. Thus, the threshold may correspond to the RSRP of the SSB message 205 that indicates the threshold. If the measured RSRP of the SSB message 205 is greater than or equal to the threshold, then the UE 115-*a* may determine to not transmit the PRACH repetition (e.g., random access requests 210), and transmit a single PRACH instead (e.g., a single random access request 210). If the measured RSRP of the SSB message 205 is less than the threshold, then the UE 115-*a* may determine to transmit the PRACH repetition including the random access requests 210-*a*, 210-*b*, and 210-*b*. As noted, the UE 115-*a* may adjust the threshold or determine an updated threshold based on the power class of the UE 115, as well as other information.

Some wireless communications systems 200 may also support repetitions of a Msg3 in the random access procedure. Msg3 repetition may depend on the RSRP of the synchronization signal (SS). As such, as RSRP threshold for determining whether to transmit the Msg3 repetition may be configured by the network entity 105-*a* at the UE 115-*a*.

According to techniques described herein, the threshold for SSB based RSRP and PRACH repetition may be different from the threshold for Msg3 repetition (e.g., Msg3 repetition request). In some cases, whether the RSRP threshold for applying PRACH repetition is lower or the RSRP threshold for requesting Msg3 may depend on the relationship between coverage of PRACH and coverage of Msg3. In some examples, the threshold for SSB based RSRP for applying PRACH repetition may be identified based on the configured threshold for Msg3 repetition. In one example, the network entity 105-a may configure (e.g., using RMSI or OSI) the threshold for SS based RSRP for requesting Msg3 repetition, and additional bits (e.g., one or two bits) in the RMSI or OSI may be used to indicate a differential (e.g., offset or correcting term) to determine the threshold for PRACH repetition relative to the threshold for Msg3 repetition. In some examples, the offset or differential may be determined by the UE 115-a based on PRACH format, frequency range (e.g., operating frequency), operating band, subcarrier spacing (e.g., according to a predefined table in standard specifications), or a combination thereof. For example, a set of subcarrier spacings (e.g., or frequencies or bands) may be mapped to respective offsets, and the UE 115-a may determine the offset relative to the configured Msg3 repetition threshold using these offsets. In some examples, the offsets may be configured according to a table.

In the same or alternative examples, the threshold that is used for PRACH repetition may be dependent on the number of previously failed PRACH trials or attempts (e.g., random access procedures that did not result in an established connection). Thus, in case of one or more previously failed PRACH trials, the UE 115-a may increase the threshold such that the UE 115-a has a higher likelihood of transmitting the set of random access requests 210 (e.g., due to the RSRP of the SSB being below the increased threshold). In some examples, after a failed PRACH trial, the UE 115-a may increase the threshold by preconfigured increment values. For example, the UE 115-a may increase the threshold by an increment value configured by the network entity 105-a (e.g., a 3 dB increase). Additionally, or alternatively, the UE 115-a may increase the threshold by an increment configured by system information (e.g., a system information block (SIB)). In some cases, the increment value (or its applicability to PRACH repetition) may be based on one or more channel parameters (e.g., operating frequency range, an operating frequency band, subcarrier spacing, PRACH format, or a combination thereof).

In some examples, a separate procedure may be used for PRACH repetition in CFRA and CBRA. That is, a different criteria and/or threshold may be used for triggering PRACH repetition in CFRA than CBRA, where the different criteria and/or threshold may be signaled or configured using the techniques described herein. In some examples, the criteria (e.g., threshold) for triggering PRACH repetition may depend on delay constraints, a specified quality of services (QoS), UE type, and/or application type, or any combination thereof. For example, if the UE 115-a operates according to stringent latency requirements (e.g., an URLLC UE), the network entity 105-a may configure a higher threshold (e.g., as a criteria for PRACH repetition) for SSB based RSRP for PRACH repetition determination, which may reduce the probability of PRACH failure and may reduce the latency of CFRA RACH for the UE 115-a. Thus, various thresholds may be used for SSB based RSRP for PRACH repetition determination. Additionally or alternatively, the number or quantity of PRACH repetitions (e.g., the number of random access requests 210 in a repetition set) may be used as a continuation of power ramp. For example, after the UE 115-a reaches a maximum power for PRACH transmission (e.g., maximum possible transmission level of the UE), the UE 115-a may use two repetitions. If these repetitions fail (e.g., UE does not receive a reply), the UE may perform four repetitions of the random access request 210 (or any increasing number of repetitions), and so forth. The increase of PRACH repetitions after failed requests may or may not be dependent on the power level of the UE 115-a. Additionally or alternatively, the criteria (e.g., threshold) for PRACH repetition may depend on the type of repetition. For example, different criteria may be used for applying PRACH repetition dependent on the frequency or time. That is, different thresholds may be used for different component carriers, different frequencies on a same component carrier, or different random access channel (RACH) occasions. These thresholds may be configured by the network entity 105-a (e.g., using control messaging) or preconfigured at the UE 115-a. In some examples, the UE 115-a may transmit a first PRACH repetition over frequency, and if unsuccessful, the UE 115-a may transmit a second PRACH repetition over time. Additionally or alternatively, the UE 115-a may use CFRA PRACH repetition independently from the SSB based RSRP measurements. For instance, the UE 115-a may apply CFRA PRACH repetition according to a RRC signaled configuration (e.g., irrespective of SSB based RSRP measurement).

Figure 3A:
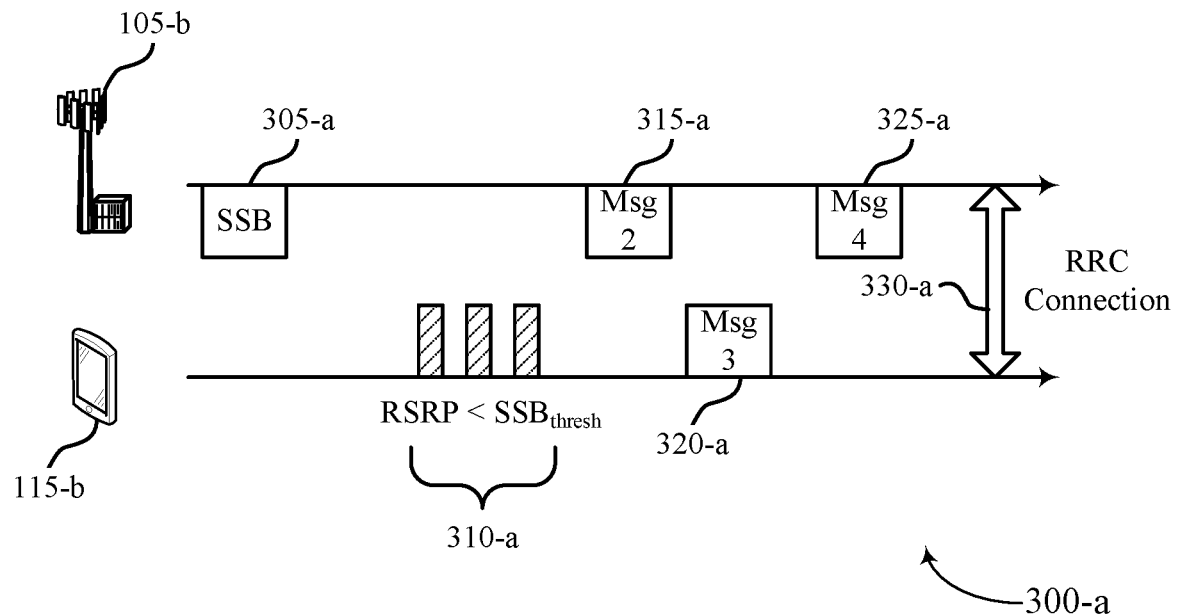
FIG. 3A and FIG. 3B illustrate examples of communication timelines that support criteria for PRACH repetition in accordance with aspects of the present disclosure.
Figure 3B:
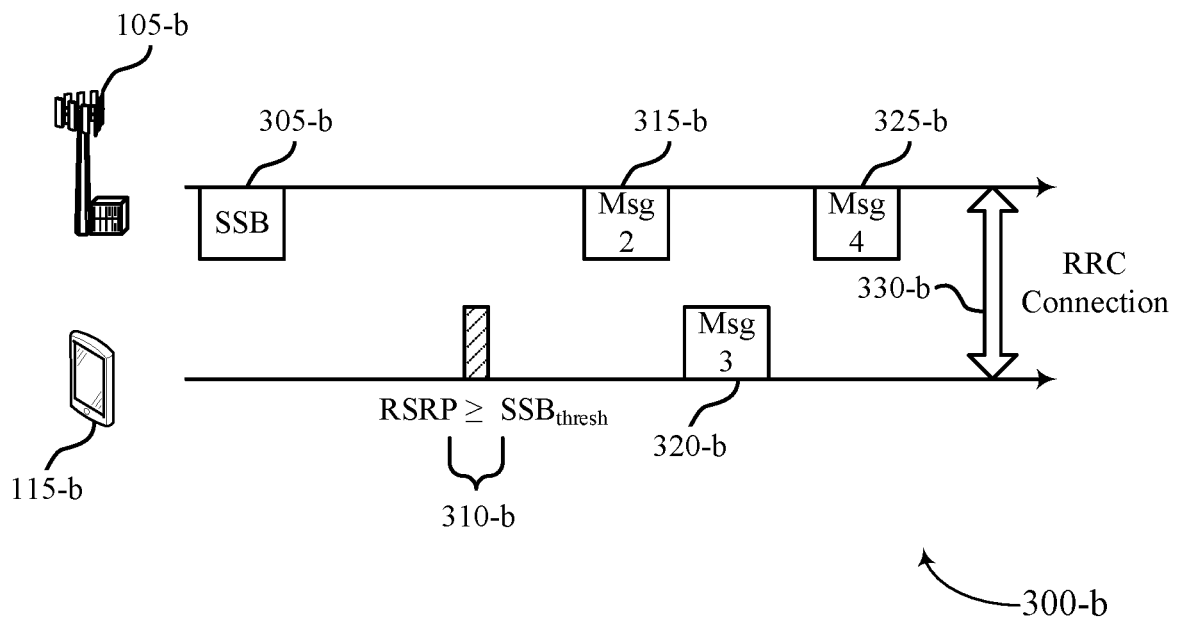

FIG. 3A and FIG. 3B illustrate examples of communication timelines 300 that support criteria for PRACH repetition in accordance with aspects of the present disclosure. The communication timelines 300 include communications by a network entity 105-b and a UE 115-b, which may be examples of the corresponding devices described with respect to FIGS. 1 and 2.

At communication timeline 300-a, the network entity 105-b may transmit an SSB 305-a. The UE 115-b may receive the SSB 305-a and identify various information, such as system information, included in the SSB 305-b. In some examples, the SSB 305-a includes system information, such as RMSI or OSI, that indicates a threshold to be used for determining whether to perform PRACH repetition. The threshold may be indicated relative to a threshold that is configured for Msg3 repetition determination. The UE 115-a may also measure a RSRP of the SSB 305-a. The UE 115-b may compare the RSRP of the SSB 305-a to the threshold (e.g., configured via the SSB 305-a) to determine whether to perform PRACH repetition.

The UE 115-b transmits a set of random access requests 310-a as random access repetitions based on the RSRP of the SSB 305-b being less than the SSB threshold ($SSB_{thresh}$). The network entity 105-b may transmit a random access response 315-a (e.g., Msg2) during a resource of a physical downlink control channel (PDCCH) that the UE 115-b monitors. The random access response 315-a may be transmitted by the network entity 105-b in reply to one or more of the random access requests 310-a. Upon receipt of the random access response, the UE 115-b may transmit a Msg3 (e.g., transmission 320-a), which may be a scheduled uplink transmission. In some examples, the UE 115-b may transmit a repetition of Msg 3 (e.g., based on a RSRP of a SS relative to a threshold). The network entity 105-b may transmit Msg4 325-a, and a RRC connection 330-a may be established based on Msg4 transmitted by the network entity 105-b.

At communication timeline 300-b, the network entity 105-b may transmit an SSB 305-b. The UE 115-b may receive the SSB 305-b and identify various information, such as system information, included in the SSB 305-b. In some examples, the SSB 305-b includes system information, such as RMSI or OSI, that indicates a threshold to be used for determining whether to perform PRACH repetition. The threshold may be indicated relative to a threshold that is configured for Msg3 repetition determination. The UE 115-a may also measure a RSRP of the SSB 305-b. The UE 115-b may compare the RSRP of the SSB 305-b to the threshold (e.g., configured via the SSB 305-b) to determine whether to perform PRACH repetition.

The UE 115-b transmits a random access request 310-b based on the RSRP of the SSB 305-b being greater than or equal to the SSB threshold ($SSB_{thresh}$). The network entity 105-b may transmit a random access response 315-b (e.g., Msg2) during a resource of a PDCCH that the UE 115-b monitors. The random access response 315-b may be transmitted by the network entity 105-b in reply to one or more of the random access requests 310-b. Upon receipt of the random access response, the UE 115-b may transmit a Msg3 (e.g., a transmission 320-b), which may be a scheduled uplink transmission. In some examples, the UE 115-b may transmit a repetition of Msg 3 (e.g., based on a RSRP of a SS relative to a threshold). The network entity 105-b may transmit Msg4 325-b. An RRC connection 330-a may be established based on Msg4 transmitted by the network entity 105-b.

In some cases, if the random access procedure fails (e.g., in either communication timeline 300-a or communication timeline 300-b), the UE 115-b may determine to increase the threshold (e.g., $SSB_{thresh}$) that is used for PRACH repetition determination in a next RACH occasion. That is, if the UE 115-b and the network entity 105-b fail to establish the RRC connection 330-b, then the UE 115-b may increase the threshold to determine whether to perform PRACH repetition in a subsequent RACH occasion.

Figure 4:
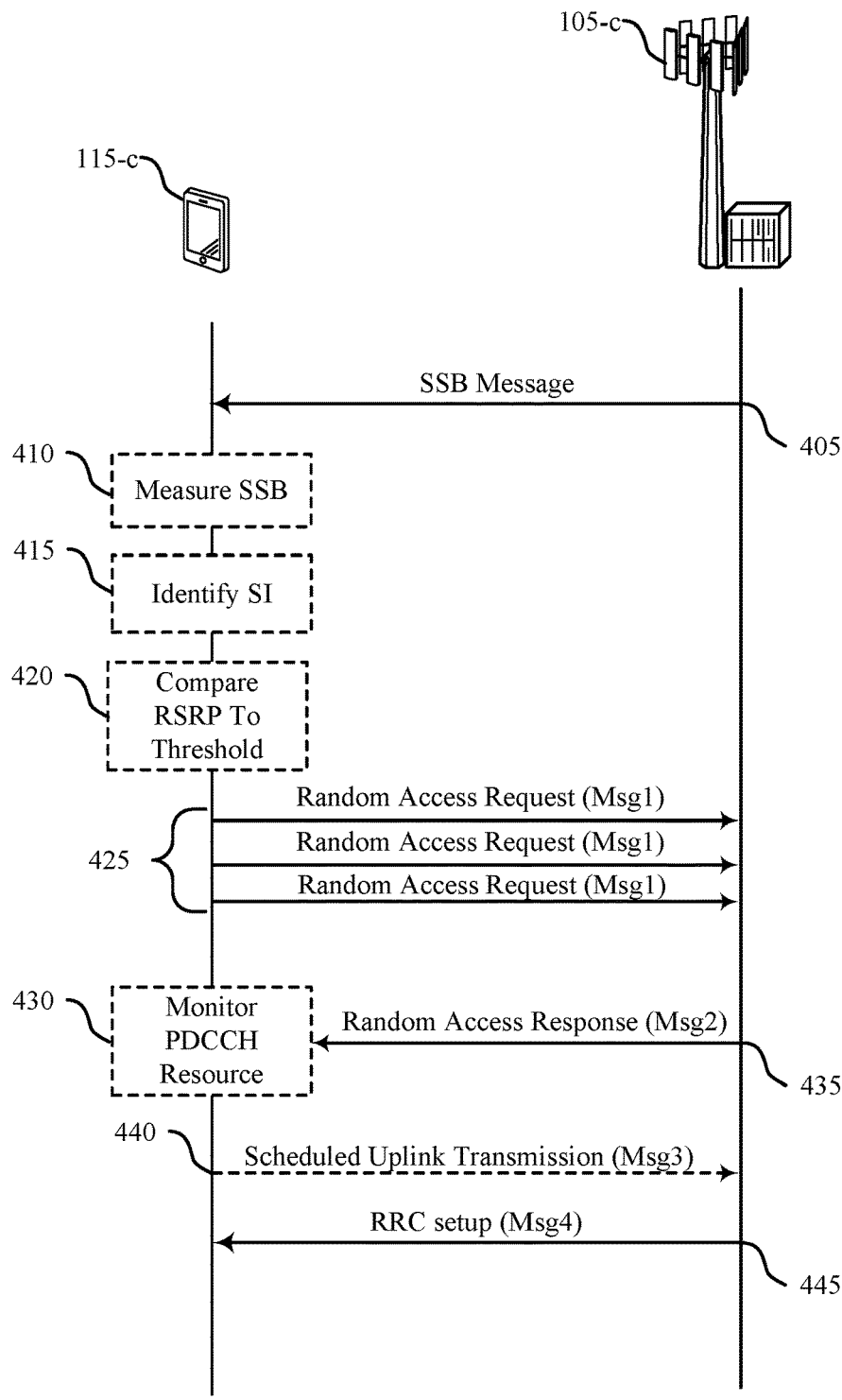
FIG. 4 illustrates an example of a process flow that supports criteria for PRACH repetition in accordance with aspects of the present disclosure.

FIG. 4 illustrates an example of a process flow 400 that supports criteria for PRACH repetition in accordance with aspects of the present disclosure. The process flow 400 may be implemented by aspects of wireless communications systems 100 and 200 of FIG. 1 and FIG. 2. The process flow 400 may also illustrate aspects of communication timelines 300 of FIG. 3A and FIG. 3B. The process flow 400 includes a UE 115-c and a network entity 105-c, which may be examples of the corresponding devices described with respect to FIGS. 1 through 3.

In the following description of the process flow 400, the operations may be performed in a different order than the order shown, or the operations performed by UE 115-c and network entity 105-c may be performed in different orders or at different times. For example, specific operations may also be left out of the process flow 400, or other operations may be added to the process flow 400. Although UE 115-c and network entity 105-c are shown performing the operations of the process flow 400, some aspects of some operations may also be performed by one or more other devices.

At 405, the network entity 105-c may transmit, and the UE 115-c may receive, an SSB message. At 410, the UE 115-c may measure a RSRP of the SSB message. At 415, the UE 115-c may identify system information (SI) included in the SSB message. The SSB message may include system information that indicates a RSRP threshold. The system information may be RMSI, OSI, or both. In some cases, the system information may indicate a second reference signal received power threshold (different from the RSRP threshold that is used for PRACH repetition determination). The system information may also indicate an offset that is used to determine the RSRP threshold for PRACH repetition determination relative to the threshold for scheduled uplink transmission (Msg3). In some examples, the UE 115-c may determine the offset based on a random access request format, a random access request frequency range, a random access frequency band, a subcarrier spacing associated with the random access request, or a combination thereof.

In some examples, the UE 115-c may determine the RSRP threshold based on a number of failed access requests prior to transmission of the set of repetitions of the random access request. Thus, the UE 115-c may increase the threshold if there are one or more prior failed access requests. In some examples, the threshold may depend on a random access request configuration. The threshold may also be dependent on whether the random access procedure is a CFRA or CBRA procedure, delay constraints for communications between the UE and the network entity, quality of service requirements between the UE and the network entity, a type of the UE, an application type, an operating frequency of the UE, a current random access channel occasion, or a combination thereof.

At 420, the UE 115-c may compare the RSRP of the SSB message to the threshold to determine whether to transmit a set of repetitions of a random access request. If the RSRP of the SSB message is equal to or above the threshold, then the UE 115-c may determine to not transmit a set of random access request repetitions. If the RSRP is below the threshold, then the UE 115-c may determine to transmit the set of random access request repetitions.

At 425, the UE 115-c may transmit, to the network entity 105-c, a set of repetitions of a random access request based at least in part on a reference signal received power of the synchronization signal block message. In some cases, the UE 115-c may transmit the set of repetitions of the random access request based at least in part on the reference signal received power of the synchronization signal block message being below a reference signal received power threshold. The number of repetitions may be configured at the UE 115-c, predetermined, or may be determined based on a maximum transmission power of the UE, a number of prior failed random access requests, or both.

At 430, the UE 115-c may monitor, based on transmitting the set of repetitions of the random access request, a resource of a downlink control channel for a random access response (e.g., Msg2) from the network entity 105-c. At 435, the network entity 105-c may transmit, and the UE 115-c may receive, a random access response that is based at least in part on the set of repetitions of the random access request.

At 440, the UE 115-c may transmit, to the network entity 105-c, a scheduled uplink transmission (e.g., Msg3). At 445, the network entity 105-c may transmit, and the UE 115-c may receive, an RRC setup/contention resolution message (Msg4). The UE 115-c and the network entity 105-c may establish an RRC connection based on the RRC setup/contention resolution message.

Figure 5:
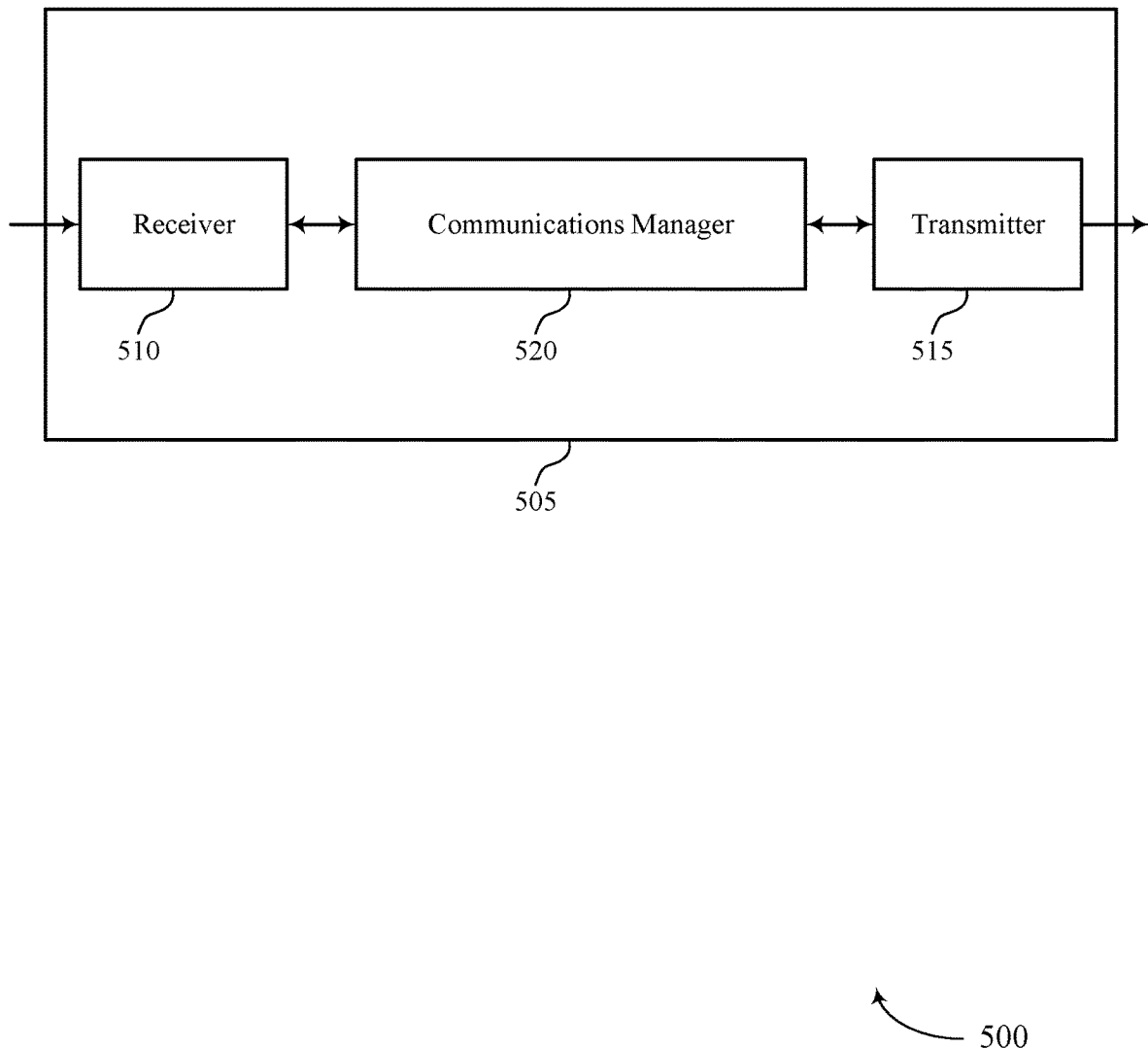
FIGS. 5 and 6 show block diagrams of devices that support criteria for PRACH repetition in accordance with aspects of the present disclosure.

FIG. 5 shows a block diagram 500 of a device 505 that supports criteria for PRACH repetition in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to criteria for PRACH repetition). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to criteria for PRACH repetition). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of criteria for PRACH repetition as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a network entity, a synchronization signal block message. The communications manager 520 may be configured as or otherwise support a means for transmitting, to the network entity, a set of repetitions of a random access request based on a reference signal received power of the synchronization signal block message. The communications manager 520 may be configured as or otherwise support a means for monitoring, based on transmitting the set of repetitions of the random access request, a resource of a downlink control channel for a random access response from the network entity.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption and more efficient utilization of communication resources by supporting random access request repetitions. Repetitions of the random access request, in various scenarios, may increase the likelihood of successful receipt at a network entity, thereby improving communication efficiency between a UE and a network entity.

Figure 6:
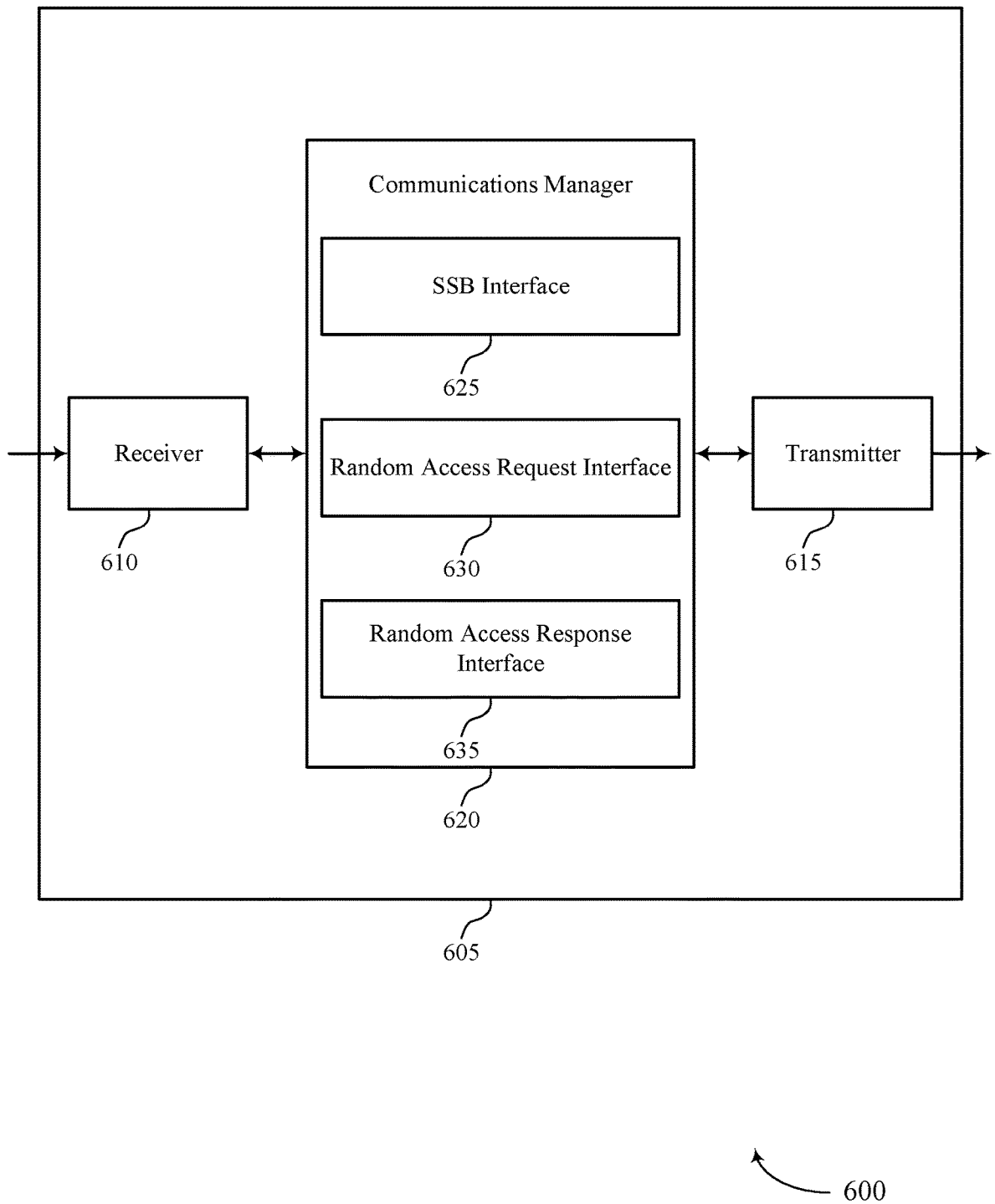

FIG. 6 shows a block diagram 600 of a device 605 that supports criteria for PRACH repetition in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to criteria for PRACH repetition). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to criteria for PRACH repetition). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of criteria for PRACH repetition as described herein. For example, the communications manager 620 may include an SSB interface 625, a random access request interface 630, a random access response interface 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The SSB interface 625 may be configured as or otherwise support a means for receiving, from a network entity, a synchronization signal block message. The random access request interface 630 may be configured as or otherwise support a means for transmitting, to the network entity, a set of repetitions of a random access request based on a reference signal received power of the synchronization signal block message. The random access response interface 635 may be configured as or otherwise support a means for monitoring, based on transmitting the set of repetitions of the random access request, a resource of a downlink control channel for a random access response from the network entity.

Figure 7:
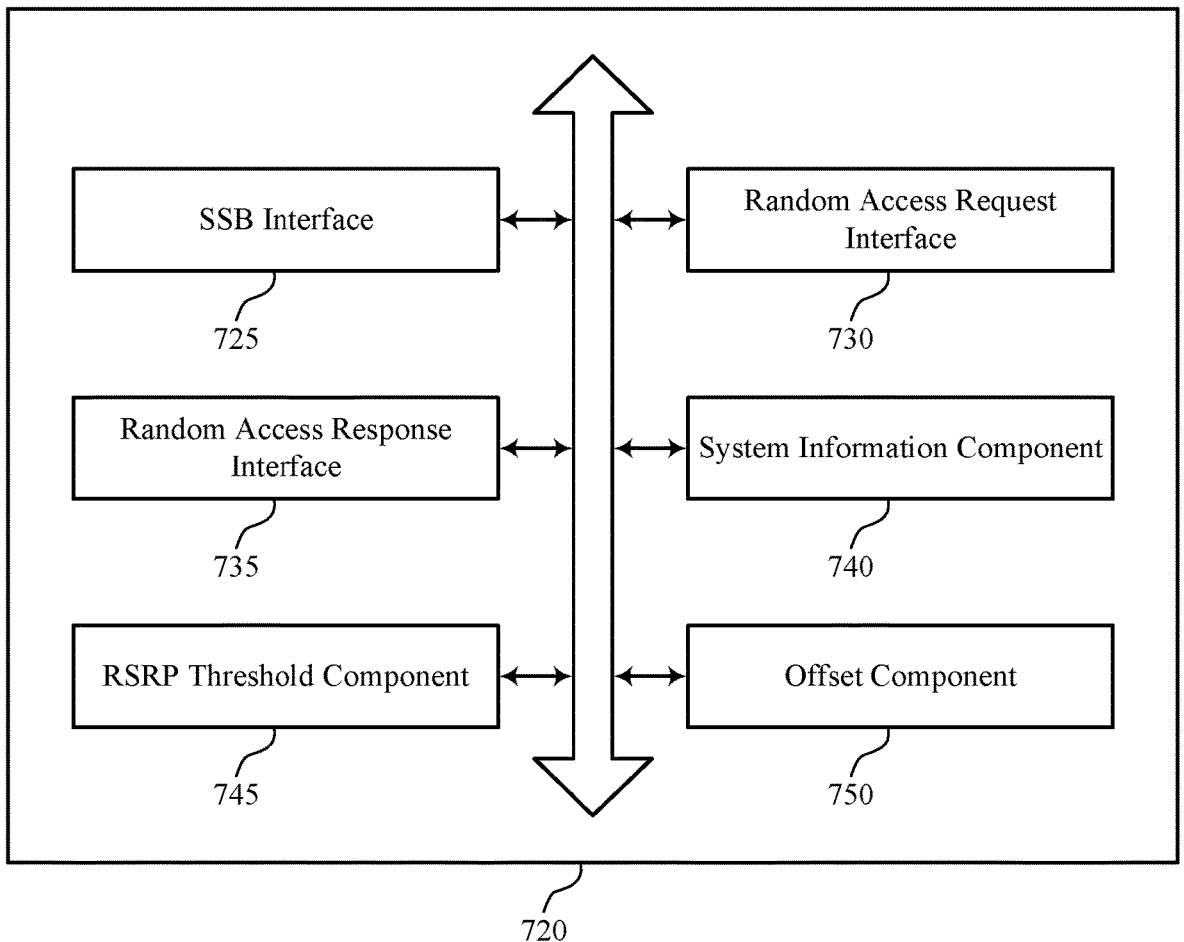
FIG. 7 shows a block diagram of a communications manager that supports criteria for PRACH repetition in accordance with aspects of the present disclosure.

FIG. 7 shows a block diagram 700 of a communications manager 720 that supports criteria for PRACH repetition in accordance with aspects of the present disclosure. The communications manager 720 may be an example of aspects of a communications manager 520, a communications manager 620, or both, as described herein. The communications manager 720, or various components thereof, may be an example of means for performing various aspects of criteria for PRACH repetition as described herein. For example, the communications manager 720 may include an SSB interface 725, a random access request interface 730, a random access response interface 735, a system information component 740, an RSRP threshold component 745, an offset component 750, or any combination thereof. Each of these components may communicate, directly or indirectly, with one another (e.g., via one or more buses).

The communications manager 720 may support wireless communication at a UE in accordance with examples as disclosed herein. The SSB interface 725 may be configured as or otherwise support a means for receiving, from a network entity, a synchronization signal block message. The random access request interface 730 may be configured as or otherwise support a means for transmitting, to the network entity, a set of repetitions of a random access request based on a reference signal received power of the synchronization signal block message. The random access response interface 735 may be configured as or otherwise support a means for monitoring, based on transmitting the set of repetitions of the random access request, a resource of a downlink control channel for a random access response from the network entity.

In some examples, to support transmitting the set of repetitions of the random access request, the random access request interface 730 may be configured as or otherwise support a means for transmitting the set of repetitions of the random access request based on the reference signal received power of the synchronization signal block message being below a reference signal received power threshold.

In some examples, to support receiving the synchronization signal block message, the system information component 740 may be configured as or otherwise support a means for receiving the synchronization signal block message that includes system information that indicates the reference signal received power threshold.

In some examples, the system information that indicates the reference signal received power threshold is remaining minimum system information (RMSI) or other system information (OSI).

In some examples, to support receiving the synchronization signal block message, the system information component 740 may be configured as or otherwise support a means for receiving the synchronization signal block message that includes system information that indicates a second reference signal received power threshold, where the reference signal received power threshold is based on the second reference signal received power threshold indicated by the system information and a power capability of the UE.

In some examples, to support receiving the synchronization signal block message, the system information component 740 may be configured as or otherwise support a means for receiving the synchronization signal block message that includes system information that indicates a second reference signal received power threshold corresponding to repetition of a scheduled uplink transmission, where the reference signal received power threshold is based on the second reference signal received power threshold indicated by the system information.

In some examples, to support receiving the synchronization signal block message, the offset component 750 may be configured as or otherwise support a means for receiving the system information that indicates an offset that is used to determine the reference signal received power relative to the second reference signal received power threshold indicated by the system information.

In some examples, the offset component 750 may be configured as or otherwise support a means for determining an offset based on a random access request format, a random access request frequency range, a random access frequency band, a subcarrier spacing associated with the random access request, or a combination thereof, where the reference signal received power threshold is determined relative to the second reference signal received power threshold using the determined offset.

In some examples, the RSRP threshold component 745 may be configured as or otherwise support a means for determining the reference signal received power threshold based on a number of failed access requests prior to transmission of the set of repetitions of the random access request.

In some examples, the RSRP threshold component 745 may be configured as or otherwise support a means for determining that the reference signal received power threshold is different from a second reference signal received power threshold that is used to determine whether to transmit a repetition of a scheduled uplink transmission in response to the received random access response.

In some examples, the RSRP threshold component 745 may be configured as or otherwise support a means for determining that the reference signal received power threshold based on a random access request configuration.

In some examples, the RSRP threshold component 745 may be configured as or otherwise support a means for determining that the reference signal received power threshold corresponds to a first of a contention free random access procedure or a contention based random access procedure and that a different threshold is used for a second of the contention free random access procedure and the contention based random access procedure.

In some examples, the RSRP threshold component 745 may be configured as or otherwise support a means for determining the reference signal received power threshold based on a delay constraint for communications between the UE and the network entity, quality of service requirements between the UE and the network entity, a type of the UE, an application type, or a combination thereof.

In some examples, the RSRP threshold component 745 may be configured as or otherwise support a means for determining the reference signal received power threshold based on an operating frequency of the UE, a current random access channel occasion, or both.

In some examples, the RSRP threshold component 745 may be configured as or otherwise support a means for increasing the reference signal received power threshold by an increment value in response to a failed access request.

In some examples, the RSRP threshold component 745 may be configured as or otherwise support a means for determining the increment value based at least in part on a system information included in the synchronization signal block message, an operating frequency range, an operating frequency band, a subcarrier spacing, a random access channel format, or a combination thereof.

In some examples, to support transmitting the set of repetitions of the random access request, the random access request interface 730 may be configured as or otherwise support a means for transmitting a number of repetitions of the random access request that is based on a maximum transmission power of the UE, a number of prior failed random access requests, or both.

In some examples, to support transmitting the set of repetitions of the random access request, the random access request interface 730 may be configured as or otherwise support a means for transmitting the set of repetitions according to a condition based random access procedure, where the UE performs a contention free random access procedure using signaling separate from the synchronization signal block message.

Figure 8:
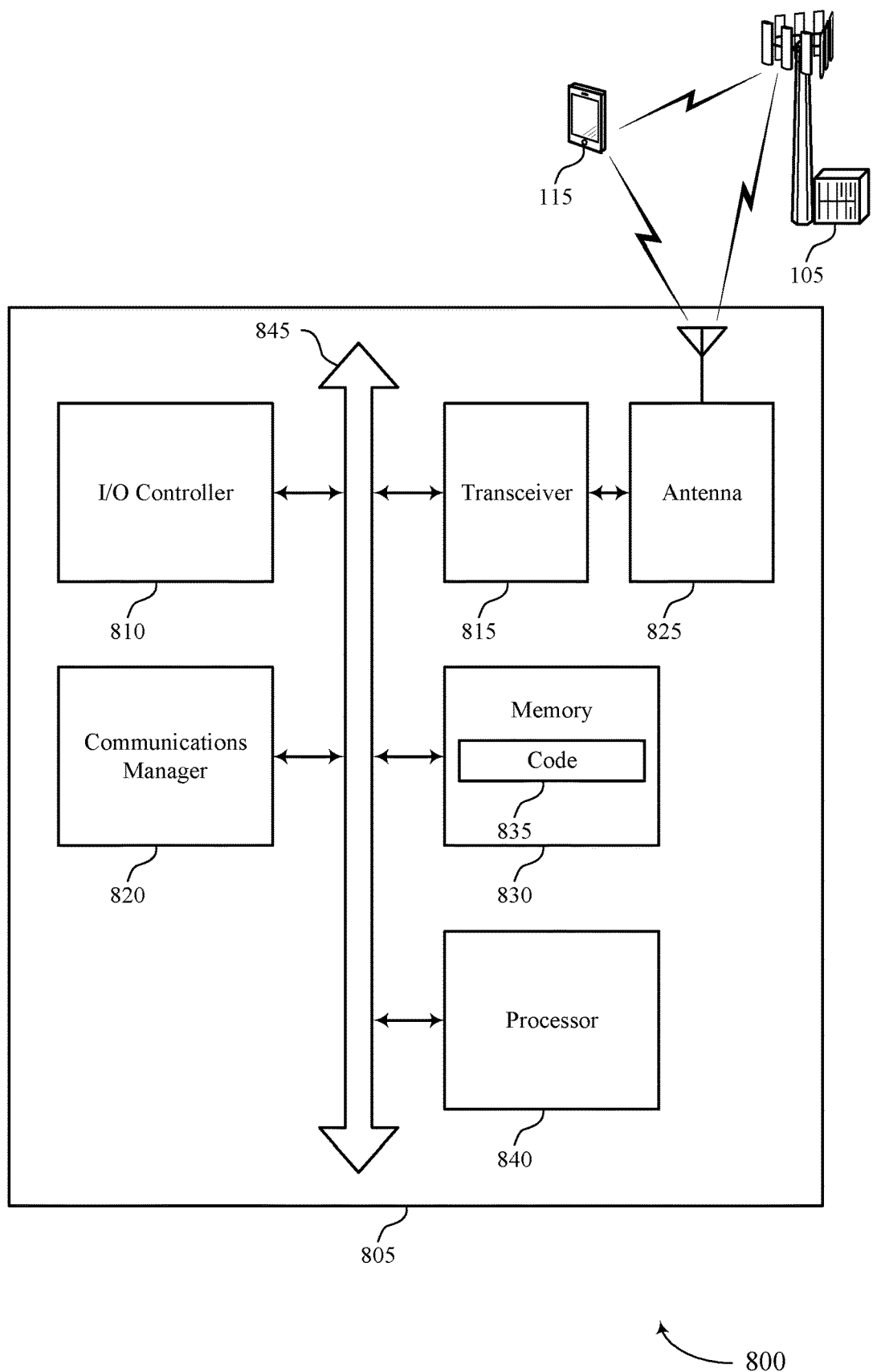
FIG. 8 shows a diagram of a system including a device that supports criteria for PRACH repetition in accordance with aspects of the present disclosure.

FIG. 8 shows a diagram of a system 800 including a device 805 that supports criteria for PRACH repetition in accordance with aspects of the present disclosure. The device 805 may be an example of or include the components of a device 505, a device 605, or a UE 115 as described herein. The device 805 may communicate wirelessly with one or more network entities 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting criteria for PRACH repetition). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a network entity, a synchronization signal block message. The communications manager 820 may be configured as or otherwise support a means for transmitting, to the network entity, a set of repetitions of a random access request based on a reference signal received power of the synchronization signal block message. The communications manager 820 may be configured as or otherwise support a means for monitoring, based on transmitting the set of repetitions of the random access request, a resource of a downlink control channel for a random access response from the network entity.

By including or configuring the communications manager 820 in accordance with examples as described herein, the device 805 may support techniques for improved communication reliability and improved coordination between devices by supporting random access request repetitions. Repetitions of the random access request, in various scenarios, may increase the likelihood of successful receipt at a network entity, thereby improving communication efficiency between a UE and a network entity.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of criteria for PRACH repetition as described herein, or the processor 840 and the memory 830 may be otherwise configured to perform or support such operations.

Figure 9:
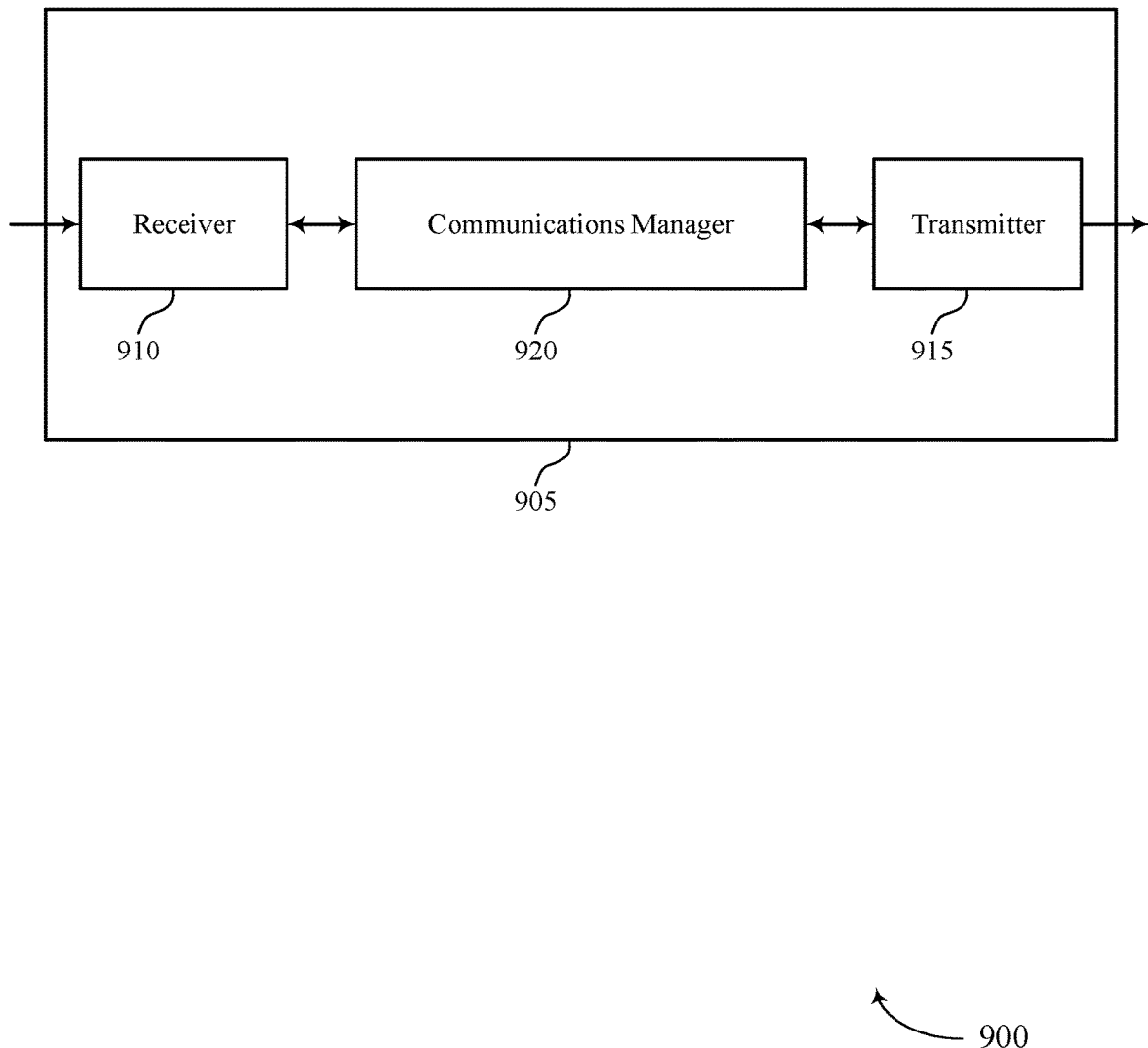
FIGS. 9 and 10 show block diagrams of devices that support criteria for PRACH repetition in accordance with aspects of the present disclosure.

FIG. 9 shows a block diagram 900 of a device 905 that supports criteria for PRACH repetition in accordance with aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to criteria for PRACH repetition). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to criteria for PRACH repetition). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of criteria for PRACH repetition as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a network entity in accordance with examples as disclosed herein. For example, the communications manager 920 may be configured as or otherwise support a means for transmitting, to a UE, synchronization signal block message. The communications manager 920 may be configured as or otherwise support a means for receiving, from the UE, a set of repetitions of a random access request based on transmitting the synchronization signal block message. The communications manager 920 may be configured as or otherwise support a means for transmitting, to the UE, a random access response that is based on the set of repetitions of the random access request received from the UE.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced power consumption and more efficient utilization of communication resources by supporting random access request repetitions. Repetitions of the random access request, in various scenarios, may increase the likelihood of successful receipt at a network entity, thereby improving communication efficiency between a UE and a network entity.

Figure 10:
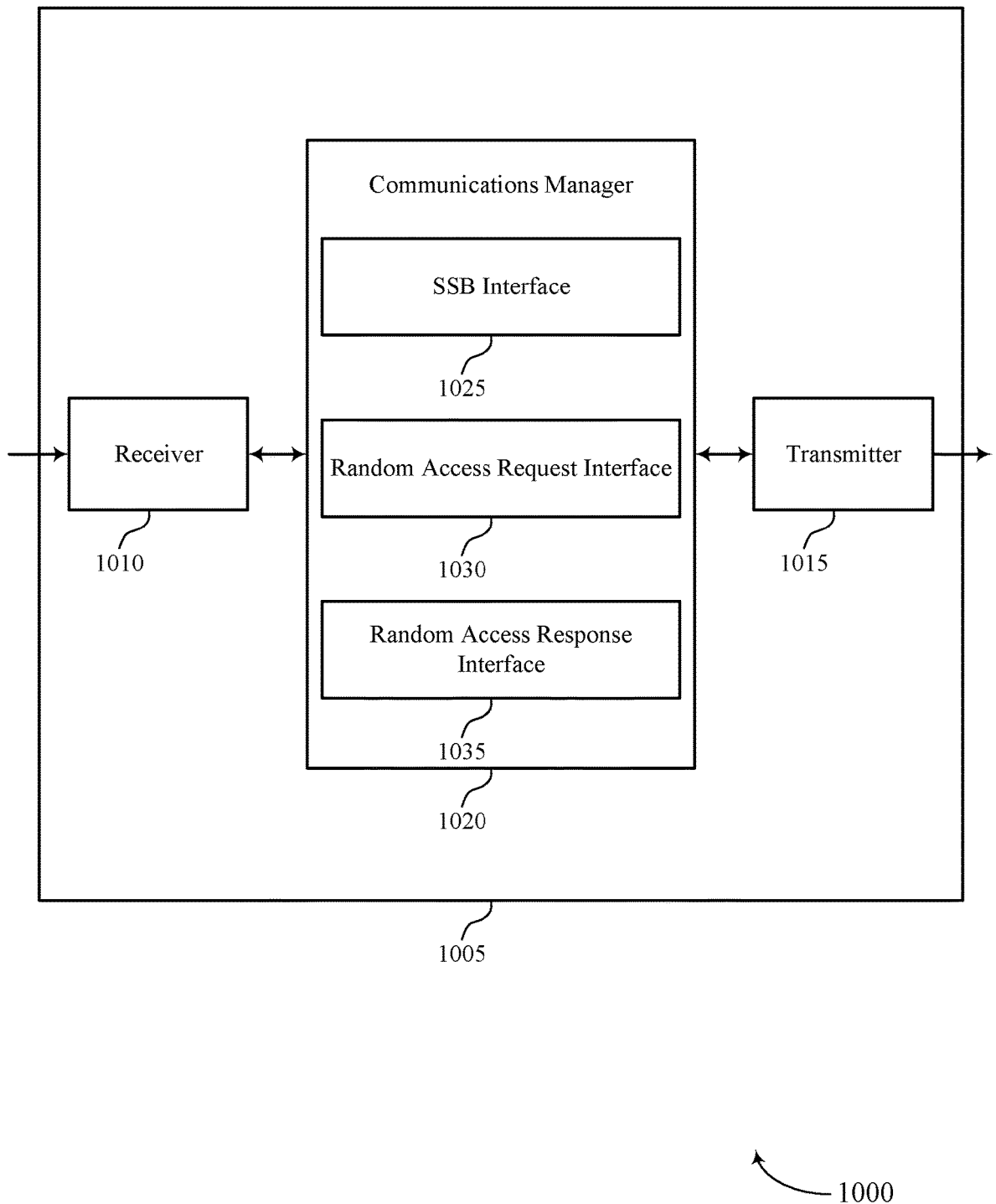

FIG. 10 shows a block diagram 1000 of a device 1005 that supports criteria for PRACH repetition in accordance with aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to criteria for PRACH repetition). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to criteria for PRACH repetition). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of criteria for PRACH repetition as described herein. For example, the communications manager 1020 may include an SSB interface 1025, a random access request interface 1030, a random access response interface 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a network entity in accordance with examples as disclosed herein. The SSB interface 1025 may be configured as or otherwise support a means for transmitting, to a UE, synchronization signal block message. The random access request interface 1030 may be configured as or otherwise support a means for receiving, from the UE, a set of repetitions of a random access request based on transmitting the synchronization signal block message. The random access response interface 1035 may be configured as or otherwise support a means for transmitting, to the UE, a random access response that is based on the set of repetitions of the random access request received from the UE.

Figure 11:
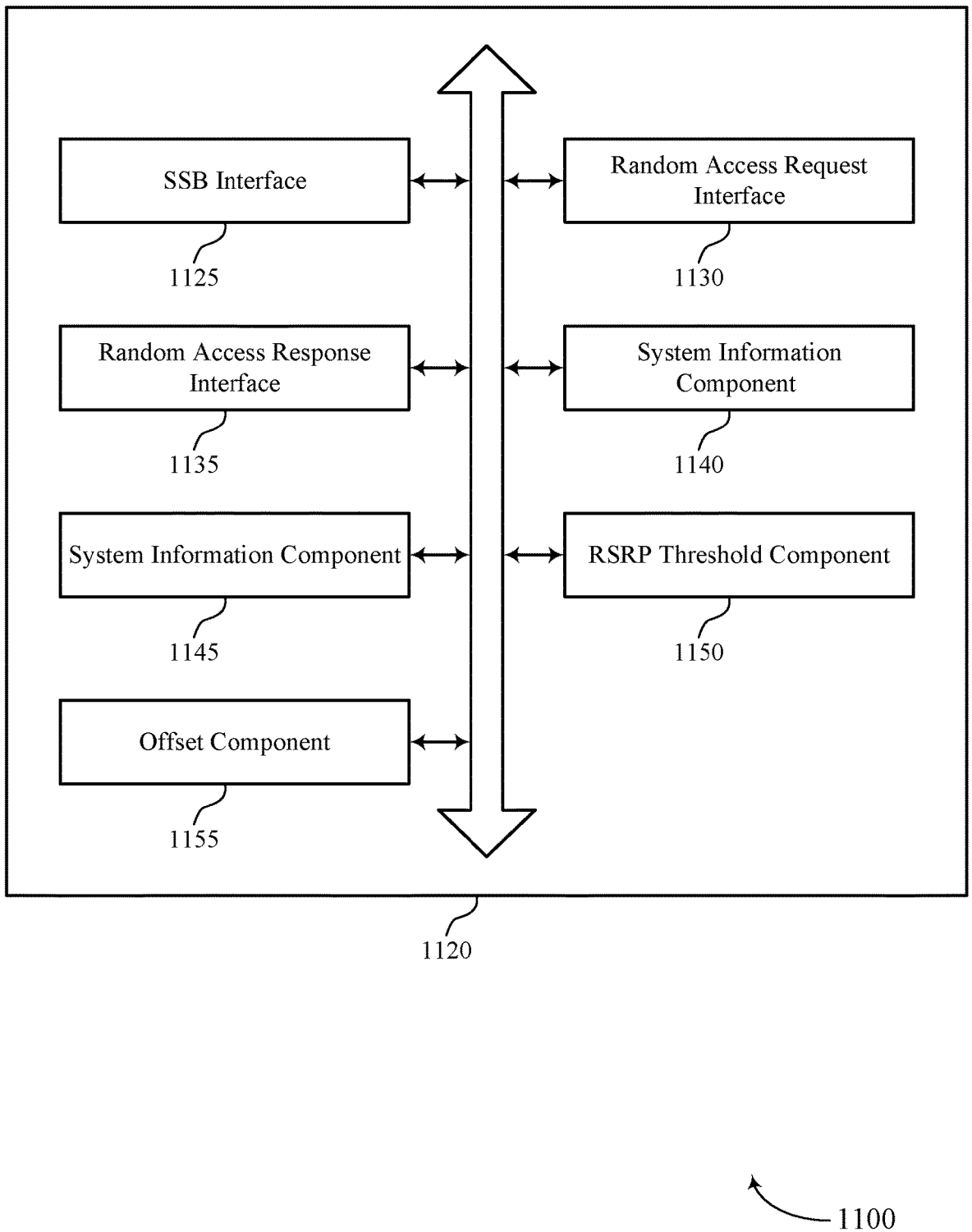
FIG. 11 shows a block diagram of a communications manager that supports criteria for PRACH repetition in accordance with aspects of the present disclosure.

FIG. 11 shows a block diagram 1100 of a communications manager 1120 that supports criteria for PRACH repetition in accordance with aspects of the present disclosure. The communications manager 1120 may be an example of aspects of a communications manager 920, a communications manager 1020, or both, as described herein. The communications manager 1120, or various components thereof, may be an example of means for performing various aspects of criteria for PRACH repetition as described herein. For example, the communications manager 1120 may include an SSB interface 1125, a random access request interface 1130, a random access response interface 1135, a system information component 1140, a system information component 1145, an RSRP threshold component 1150, an offset component 1155, or any combination thereof. Each of these components may communicate, directly or indirectly, with one another (e.g., via one or more buses).

The communications manager 1120 may support wireless communications at a network entity in accordance with examples as disclosed herein. The SSB interface 1125 may be configured as or otherwise support a means for transmitting, to a UE, synchronization signal block message. The random access request interface 1130 may be configured as or otherwise support a means for receiving, from the UE, a set of repetitions of a random access request based on transmitting the synchronization signal block message. The random access response interface 1135 may be configured as or otherwise support a means for transmitting, to the UE, a random access response that is based on the set of repetitions of the random access request received from the UE.

In some examples, to support transmitting the synchronization signal block message, the system information component 1140 may be configured as or otherwise support a means for transmitting the synchronization signal block message that includes system information that indicates a reference signal received power threshold that is to be used, by the UE, for determining whether to transmit the set of repetitions of the random access request.

In some examples, the system information that indicates the reference signal received power threshold is remaining minimum system information (RMSI) or other system information (OSI).

In some examples, the RSRP threshold component 1150 may be configured as or otherwise support a means for determining that the reference signal received power threshold is different from a second reference signal received power threshold that is used to determine whether to transmit a repetition of a scheduled uplink transmission in response to the received random access response.

In some examples, the RSRP threshold component 1150 may be configured as or otherwise support a means for determining that the reference signal received power threshold based on a random access request configuration.

In some examples, the RSRP threshold component 1150 may be configured as or otherwise support a means for determining that the reference signal received power threshold corresponds to a first of a contention free random access procedure or a contention based random access procedure and that a different threshold is used for a second of the contention free random access procedure and the contention based random access procedure.

In some examples, the RSRP threshold component 1150 may be configured as or otherwise support a means for determining the reference signal received power threshold based on a delay constraint for communications between the UE and the network entity, quality of service requirements between the UE and the network entity, a type of the UE, an application type, or a combination thereof.

In some examples, the RSRP threshold component 1150 may be configured as or otherwise support a means for transmitting the synchronization signal block message that indicates an increment value that the UE is to apply to the reference signal received power threshold in response to a failed access request.

In some examples, to support transmitting the synchronization signal block message, the system information component 1145 may be configured as or otherwise support a means for transmitting the synchronization signal block message that includes system information that indicates a first reference signal received power threshold that is to be used, by the UE, for determining whether to transmit a set of repetitions of the random access request and is used for determining a second reference signal received power threshold to be used for determining to transmit the set of repetitions of the random access request.

In some examples, to support transmitting the synchronization signal block message, the offset component 1155 may be configured as or otherwise support a means for transmitting the synchronization signal block message that includes system information that indicates an offset in addition to the first reference signal received power threshold, where the offset is used to determine the second reference signal received power threshold relative to the first reference signal received power threshold.

Figure 12:
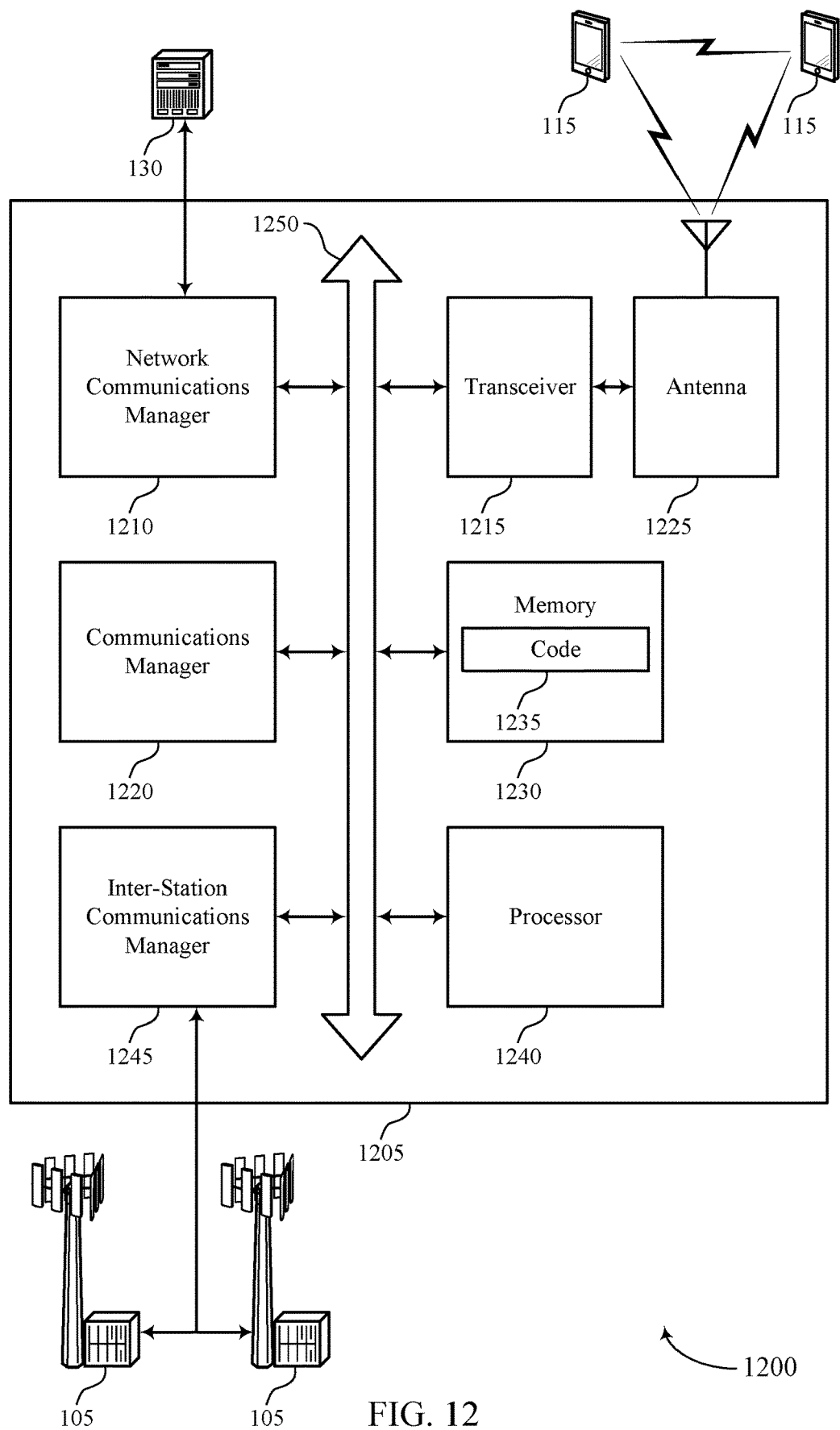
FIG. 12 shows a diagram of a system including a device that supports criteria for PRACH repetition in accordance with aspects of the present disclosure.

FIG. 12 shows a diagram of a system 1200 including a device 1205 that supports criteria for PRACH repetition in accordance with aspects of the present disclosure. The device 1205 may be an example of or include the components of a device 905, a device 1005, or a network entity 105 as described herein. The device 1205 may communicate wirelessly with one or more network entities 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting criteria for PRACH repetition). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other network entities 105, and may include a controller or scheduler for controlling communications with UEs 115 in cooperation with other network entities 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for transmitting, to a UE, synchronization signal block message. The communications manager 1220 may be configured as or otherwise support a means for receiving, from the UE, a set of repetitions of a random access request based on transmitting the synchronization signal block message. The communications manager 1220 may be configured as or otherwise support a means for transmitting, to the UE, a random access response that is based on the set of repetitions of the random access request received from the UE.

By including or configuring the communications manager 1220 in accordance with examples as described herein, the device 1205 may support techniques for improved communication reliability and improved coordination between devices by supporting random access request repetitions. Repetitions of the random access request, in various scenarios, may increase the likelihood of successful receipt at a network entity, thereby improving communication efficiency between a UE and a network entity In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of criteria for PRACH repetition as described herein, or the processor 1240 and the memory 1230 may be otherwise configured to perform or support such operations.

Figure 13:
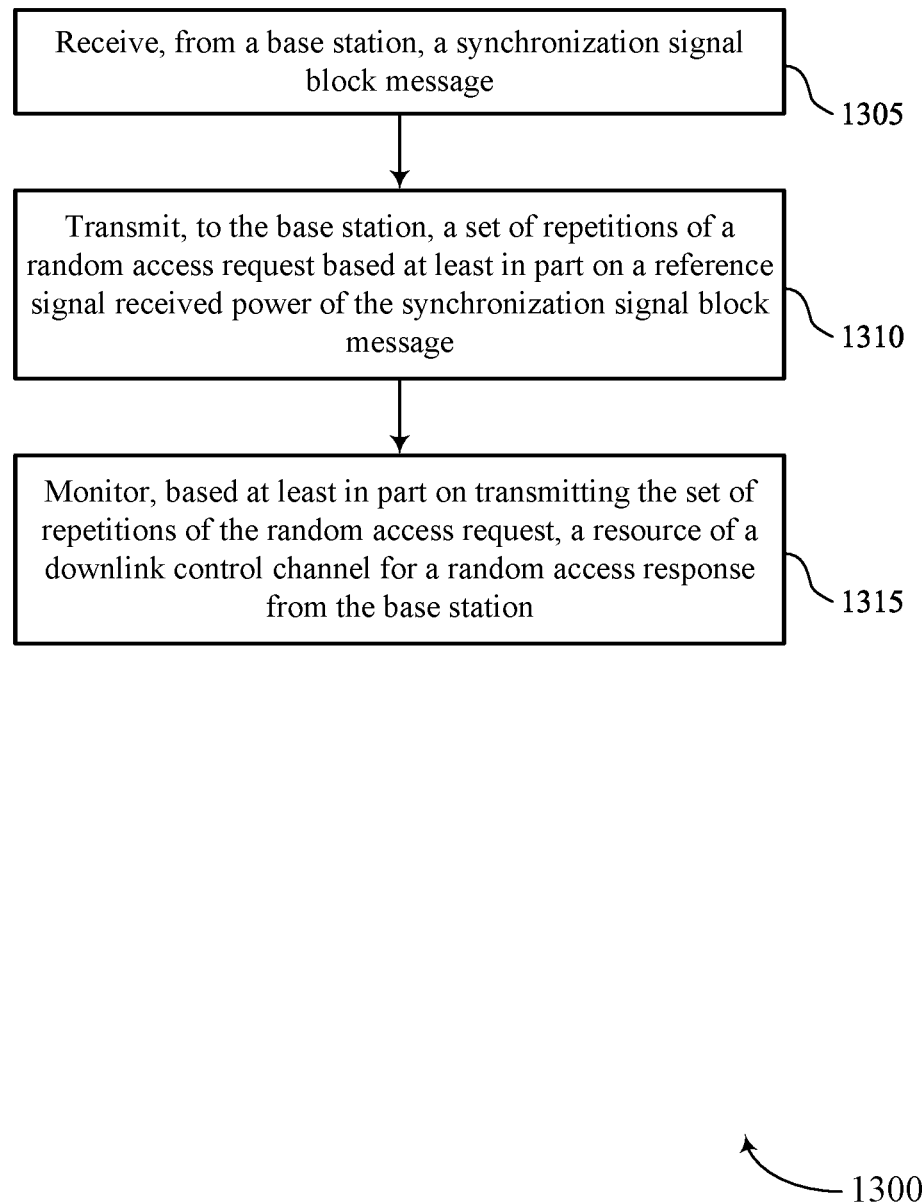
FIGS. 13 through 16 show flowcharts illustrating methods that support criteria for PRACH repetition in accordance with aspects of the present disclosure.

FIG. 13 shows a flowchart illustrating a method 1300 that supports criteria for PRACH repetition in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a network entity, a synchronization signal block message. The operations of 1305 may be performed in accordance with examples as disclosed herein. In some examples, aspects of the operations of 1305 may be performed by an SSB interface 725 as described with reference to FIG. 7.

At 1310, the method may include transmitting, to the network entity, a set of repetitions of a random access request based on a reference signal received power of the synchronization signal block message. The operations of 1310 may be performed in accordance with examples as disclosed herein. In some examples, aspects of the operations of 1310 may be performed by a random access request interface 730 as described with reference to FIG. 7.

At 1315, the method may include monitoring, based on transmitting the set of repetitions of the random access request, a resource of a downlink control channel for a random access response from the network entity. The operations of 1315 may be performed in accordance with examples as disclosed herein. In some examples, aspects of the operations of 1315 may be performed by a random access response interface 735 as described with reference to FIG. 7.

Figure 14:
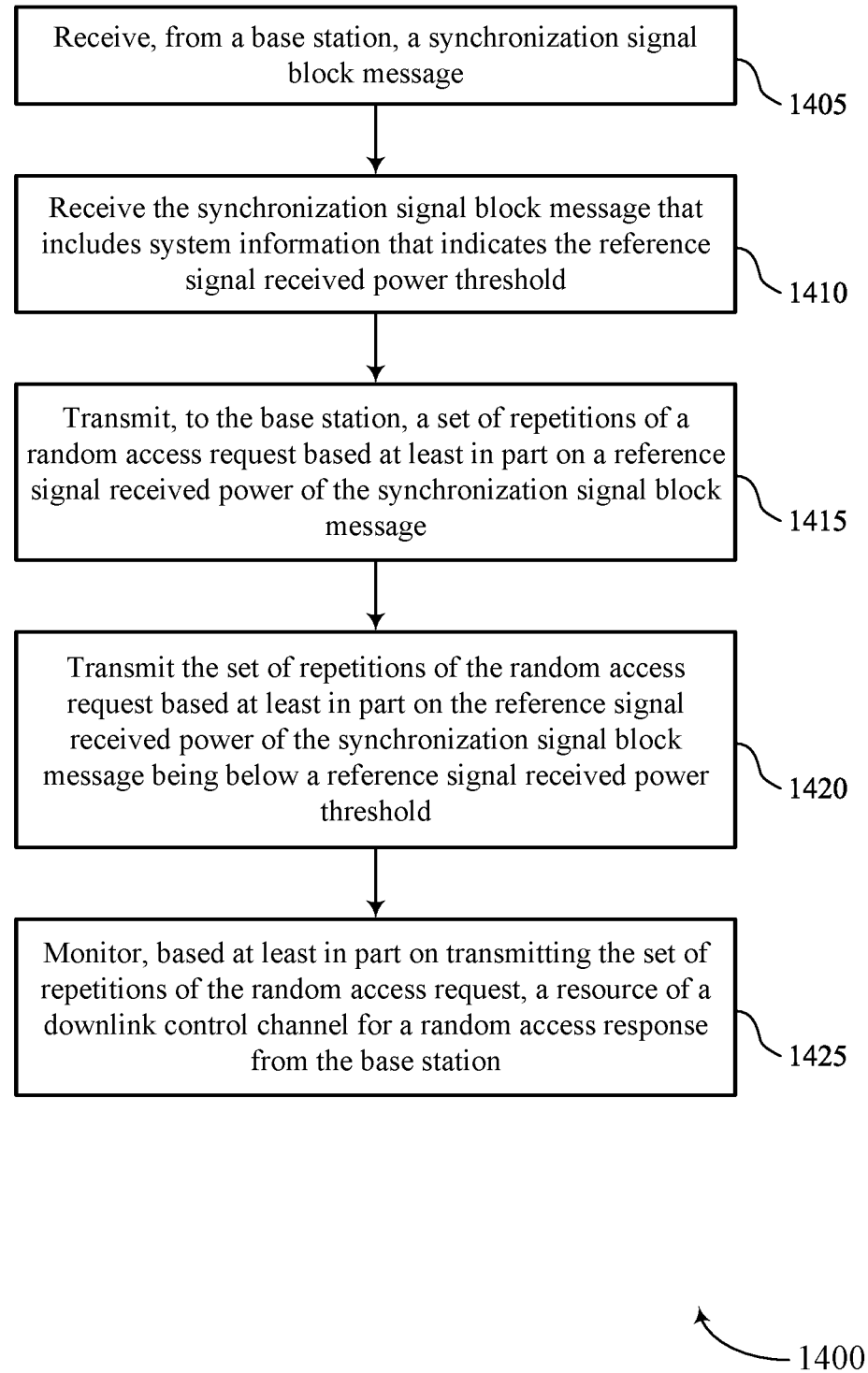

FIG. 14 shows a flowchart illustrating a method 1400 that supports criteria for PRACH repetition in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a network entity, a synchronization signal block message. The operations of 1405 may be performed in accordance with examples as disclosed herein. In some examples, aspects of the operations of 1405 may be performed by an SSB interface 725 as described with reference to FIG. 7.

At 1410, the method may include receiving the synchronization signal block message that includes system information that indicates the reference signal received power threshold. The operations of 1410 may be performed in accordance with examples as disclosed herein. In some examples, aspects of the operations of 1410 may be performed by a system information component 740 as described with reference to FIG. 7.

At 1415, the method may include transmitting, to the network entity, a set of repetitions of a random access request based on a reference signal received power of the synchronization signal block message. The operations of 1415 may be performed in accordance with examples as disclosed herein. In some examples, aspects of the operations of 1415 may be performed by a random access request interface 730 as described with reference to FIG. 7.

At 1420, the method may include transmitting the set of repetitions of the random access request based on the reference signal received power of the synchronization signal block message being below a reference signal received power threshold. The operations of 1420 may be performed in accordance with examples as disclosed herein. In some examples, aspects of the operations of 1420 may be performed by a random access request interface 730 as described with reference to FIG. 7.

At 1425, the method may include monitoring, based on transmitting the set of repetitions of the random access request, a resource of a downlink control channel for a random access response from the network entity. The operations of 1425 may be performed in accordance with examples as disclosed herein. In some examples, aspects of the operations of 1425 may be performed by a random access response interface 735 as described with reference to FIG. 7.

Figure 15:
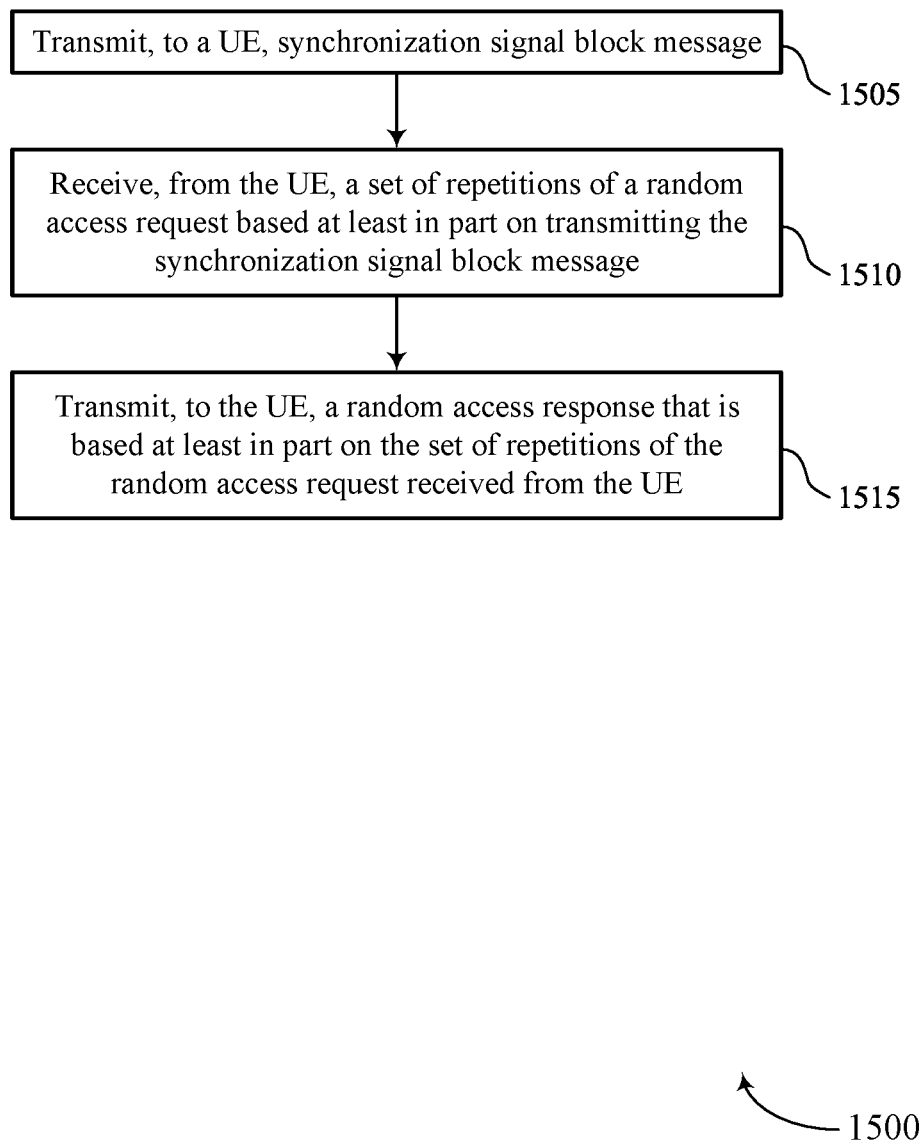

FIG. 15 shows a flowchart illustrating a method 1500 that supports criteria for PRACH repetition in accordance with aspects of the present disclosure. The operations of the method 1500 may be implemented by a network entity or its components as described herein. For example, the operations of the method 1500 may be performed by a network entity 105 as described with reference to FIGS. 1 through 4 and 9 through 12. In some examples, a network entity may execute a set of instructions to control the functional elements of the network entity to perform the described functions. Additionally or alternatively, the network entity may perform aspects of the described functions using special-purpose hardware.

At 1505, the method may include transmitting, to a UE, synchronization signal block message. The operations of 1505 may be performed in accordance with examples as disclosed herein. In some examples, aspects of the operations of 1505 may be performed by an SSB interface 1125 as described with reference to FIG. 11.

At 1510, the method may include receiving, from the UE, a set of repetitions of a random access request based on transmitting the synchronization signal block message. The operations of 1510 may be performed in accordance with examples as disclosed herein. In some examples, aspects of the operations of 1510 may be performed by a random access request interface 1130 as described with reference to FIG. 11.

At 1515, the method may include transmitting, to the UE, a random access response that is based on the set of repetitions of the random access request received from the UE. The operations of 1515 may be performed in accordance with examples as disclosed herein. In some examples, aspects of the operations of 1515 may be performed by a random access response interface 1135 as described with reference to FIG. 11.

Figure 16:
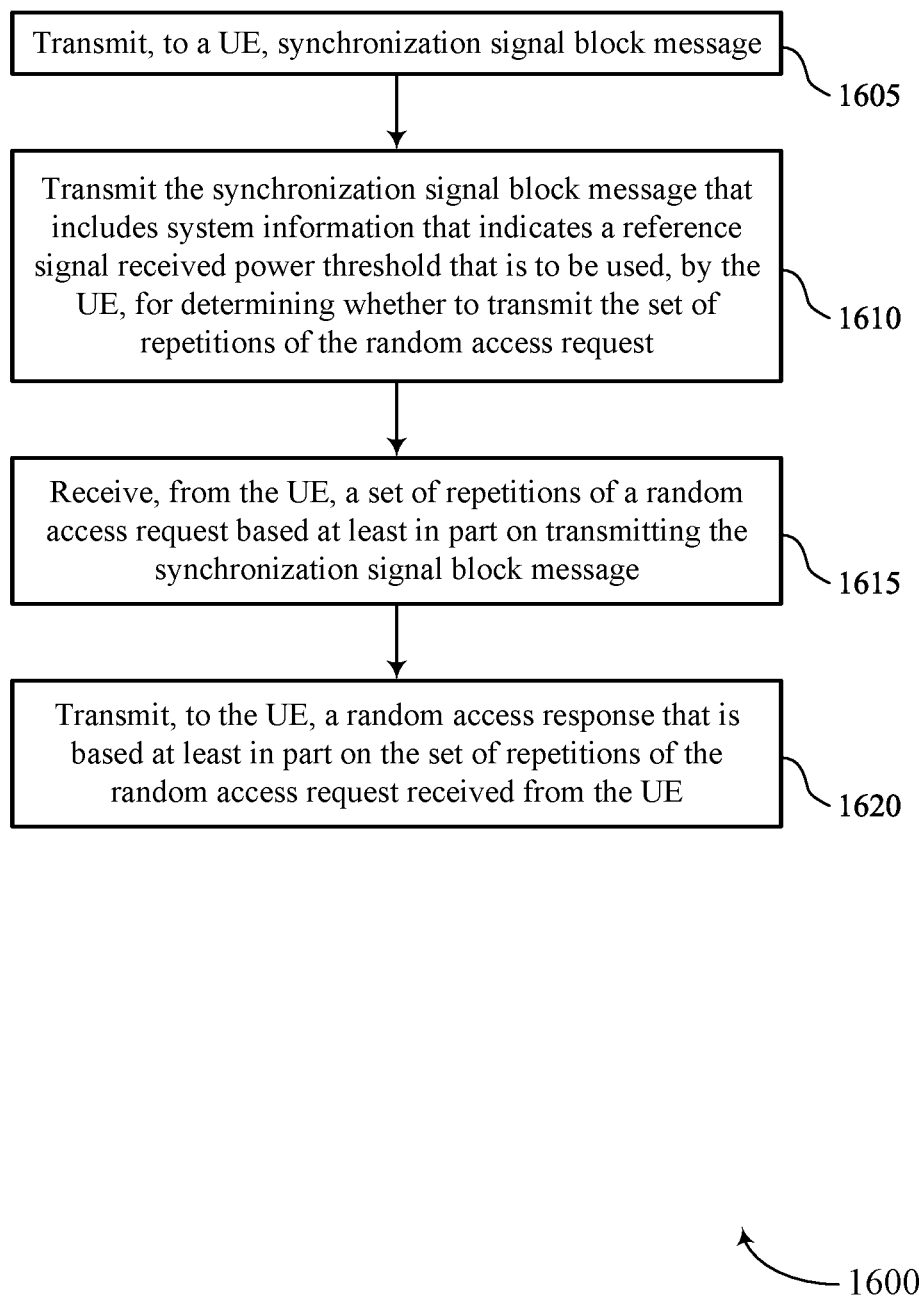

FIG. 16 shows a flowchart illustrating a method 1600 that supports criteria for PRACH repetition in accordance with aspects of the present disclosure. The operations of the method 1600 may be implemented by a network entity or its components as described herein. For example, the operations of the method 1600 may be performed by a network entity 105 as described with reference to FIGS. 1 through 4 and 9 through 12. In some examples, a network entity may execute a set of instructions to control the functional elements of the network entity to perform the described functions. Additionally or alternatively, the network entity may perform aspects of the described functions using special-purpose hardware.

At 1605, the method may include transmitting, to a UE, synchronization signal block message. The operations of 1605 may be performed in accordance with examples as disclosed herein. In some examples, aspects of the operations of 1605 may be performed by an SSB interface 1125 as described with reference to FIG. 11.

At 1610, the method may include transmitting the synchronization signal block message that includes system information that indicates a reference signal received power threshold that is to be used, by the UE, for determining whether to transmit the set of repetitions of the random access request. The operations of 1610 may be performed in accordance with examples as disclosed herein. In some examples, aspects of the operations of 1610 may be performed by a system information component 1140 as described with reference to FIG. 11.

At 1615, the method may include receiving, from the UE, a set of repetitions of a random access request based on transmitting the synchronization signal block message. The operations of 1615 may be performed in accordance with examples as disclosed herein. In some examples, aspects of the operations of 1615 may be performed by a random access request interface 1130 as described with reference to FIG. 11.

At 1620, the method may include transmitting, to the UE, a random access response that is based on the set of repetitions of the random access request received from the UE. The operations of 1620 may be performed in accordance with examples as disclosed herein. In some examples, aspects of the operations of 1620 may be performed by a random access response interface 1135 as described with reference to FIG. 11.

The following provides an overview of aspects of the present disclosure:

Aspect 1: A method for wireless communication at a UE, comprising: receiving, from a network entity, a synchronization signal block message; transmitting, to the network entity, a set of repetitions of a random access request based at least in part on a reference signal received power of the synchronization signal block message; and monitoring, based at least in part on transmitting the set of repetitions of the random access request, a resource of a downlink control channel for a random access response from the network entity.

Aspect 2: The method of aspect 1, wherein transmitting the set of repetitions of the random access request comprises: transmitting the set of repetitions of the random access request based at least in part on the reference signal received power of the synchronization signal block message being below a reference signal received power threshold.

Aspect 3: The method of aspect 2, wherein receiving the synchronization signal block message comprises: receiving the synchronization signal block message that includes system information that indicates the reference signal received power threshold.

Aspect 4: The method of aspect 3, wherein the system information that indicates the reference signal received power threshold is remaining minimum system information (RMSI) or other system information (OSI).

Aspect 5: The method of any of aspects 2 through 4, wherein receiving the synchronization signal block message comprises: receiving the synchronization signal block message that includes system information that indicates a second reference signal received power threshold, wherein the reference signal received power threshold is based at least in part on the second reference signal received power threshold indicated by the system information and a power capability of the UE.

Aspect 6: The method of any of aspects 2 through 4, wherein receiving the synchronization signal block message comprises: receiving the synchronization signal block message that includes system information that indicates a second reference signal received power threshold corresponding to repetition of a scheduled uplink transmission, wherein the reference signal received power threshold is based at least in part on the second reference signal received power threshold indicated by the system information.

Aspect 7: The method of aspect 6, wherein receiving the synchronization signal block message comprises: receiving the system information that indicates an offset that is used to determine the reference signal received power relative to the second reference signal received power threshold indicated by the system information.

Aspect 8: The method of aspect 6, further comprising: determining an offset based at least in part on a random access request format, a random access request frequency range, a random access frequency band, a subcarrier spacing associated with the random access request, or a combination thereof, wherein the reference signal received power threshold is determined relative to the second reference signal received power threshold using the determined offset.

Aspect 9: The method of any of aspects 2 through 8, further comprising: determining the reference signal received power threshold based at least in part on a number of failed access requests prior to transmission of the set of repetitions of the random access request.

Aspect 10: The method of any of aspects 2 through 9, further comprising: determining that the reference signal received power threshold is different from a second reference signal received power threshold that is used to determine whether to transmit a repetition of a scheduled uplink transmission in response to the received random access response.

Aspect 11: The method of any of aspects 2 through 10, further comprising: determining that the reference signal received power threshold based at least in part on a random access request configuration.

Aspect 12: The method of any of aspects 2 through 11, further comprising: determining that the reference signal received power threshold corresponds to a first of a contention free random access procedure or a contention based random access procedure and that a different threshold is used for a second of the contention free random access procedure and the contention based random access procedure.

Aspect 13: The method of any of aspects 2 through 12, further comprising: determining the reference signal received power threshold based at least in part on a delay constraint for communications between the UE and the network entity, quality of service requirements between the UE and the network entity, a type of the UE, an application type, or a combination thereof.

Aspect 14: The method of any of aspects 2 through 13, further comprising: determining the reference signal received power threshold based at least in part on an operating frequency of the UE, a current random access channel occasion, or both.

Aspect 15: The method of any of aspects 2 through 14, further comprising: increasing the reference signal received power threshold by an increment value in response to a failed access request.

Aspect 16: The method of aspect 15, further comprising: determining the increment value based at least in part on system information included in the synchronization signal block message, an operating frequency range, an operating frequency band, a subcarrier spacing, a random access channel format, or a combination thereof.

Aspect 17: The method of any of aspects 1 through 16, wherein transmitting the set of repetitions of the random access request comprises: transmitting a number of repetitions of the random access request that is based at least in part on a maximum transmission power of the UE, a number of prior failed random access requests, or both.

Aspect 18: The method of any of aspects 1 through 17, wherein transmitting the set of repetitions comprises: transmitting the set of repetitions according to a condition based random access procedure, wherein the UE performs a contention free random access procedure using signaling separate from the synchronization signal block message.

Aspect 19: A method for wireless communications at a network entity, comprising: transmitting, to a UE, synchronization signal block message; receiving, from the UE, a set of repetitions of a random access request based at least in part on transmitting the synchronization signal block message; and transmitting, to the UE, a random access response that is based at least in part on the set of repetitions of the random access request received from the UE.

Aspect 20: The method of aspect 19, wherein transmitting the synchronization signal block message comprises: transmitting the synchronization signal block message that includes system information that indicates a reference signal received power threshold that is to be used, by the UE, for determining whether to transmit the set of repetitions of the random access request.

Aspect 21: The method of aspect 20, wherein the system information that indicates the reference signal received power threshold is remaining minimum system information (RMSI) or other system information (OSI).

Aspect 22: The method of any of aspects 20 through 21, further comprising: determining that the reference signal received power threshold is different from a second reference signal received power threshold that is used to determine whether to transmit a repetition of a scheduled uplink transmission in response to the received random access response.

Aspect 23: The method of any of aspects 20 through 22, further comprising: determining that the reference signal received power threshold based at least in part on a random access request configuration.

Aspect 24: The method of any of aspects 20 through 23, further comprising: determining that the reference signal received power threshold corresponds to a first of a contention free random access procedure or a contention based random access procedure and that a different threshold is used for a second of the contention free random access procedure and the contention based random access procedure.

Aspect 25: The method of any of aspects 20 through 24, further comprising: determining the reference signal received power threshold based at least in part on a delay constraint for communications between the UE and the network entity, quality of service requirements between the UE and the network entity, a type of the UE, an application type, or a combination thereof.

Aspect 26: The method of any of aspects 19 through 25, wherein transmitting the synchronization signal block message comprises: transmitting the synchronization signal block message that includes system information that indicates a first reference signal received power threshold that is to be used, by the UE, for determining whether to transmit a set of repetitions of the random access request and is used for determining a second reference signal received power threshold to be used for determining to transmit the set of repetitions of the random access request.

Aspect 27: The method of aspect 26, wherein transmitting the synchronization signal block message comprises: transmitting the synchronization signal block message that includes system information that indicates an offset in addition to the first reference signal received power threshold, wherein the offset is used to determine the second reference signal received power threshold relative to the first reference signal received power threshold.

Aspect 28: The method of any of aspects 19 through 27, wherein transmitting the synchronization signal block message comprises: transmitting the synchronization signal block message that indicates an increment value that the UE is to apply to the reference signal received power threshold in response to a failed access request.

Aspect 29: An apparatus for wireless communication at a UE, comprising a processor; memory coupled with the processor; and instructions stored in the memory and executable by the processor to cause the apparatus to perform a method of any of aspects 1 through 15.

Aspect 30: An apparatus for wireless communication at a UE, comprising at least one means for performing a method of any of aspects 1 through 18.

Aspect 31: A non-transitory computer-readable medium storing code for wireless communication at a UE, the code comprising instructions executable by a processor to perform a method of any of aspects 1 through 18.

Aspect 32: An apparatus for wireless communications at a network entity, comprising a processor; memory coupled with the processor; and instructions stored in the memory and executable by the processor to cause the apparatus to perform a method of any of aspects 19 through 28.

Aspect 33: An apparatus for wireless communications at a network entity, comprising at least one means for performing a method of any of aspects 19 through 28.

Aspect 34: A non-transitory computer-readable medium storing code for wireless communications at a network entity, the code comprising instructions executable by a processor to perform a method of any of aspects 19 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a network entity, a synchronization signal block message comprising system information, wherein the system information indicates a first reference signal received power threshold;
   transmitting, to the network entity, a set of repetitions of a random access request based at least in part on a reference signal received power of the synchronization signal block message satisfying a second reference signal received power threshold, wherein the second reference signal received power threshold is based at least in part on the first reference signal received power threshold and a quantity of failed access requests prior to transmission of the set of repetitions of the random access request; and
   monitoring, based at least in part on transmitting the set of repetitions of the random access request, a resource of a downlink control channel for a random access response from the network entity.

2. The method of claim 1, wherein transmitting the set of repetitions of the random access request comprises:
   transmitting the set of repetitions of the random access request based at least in part on the reference signal received power of the synchronization signal block message being below the second reference signal received power threshold.

3. The method of claim 1, wherein the system information that indicates the first reference signal received power threshold is remaining minimum system information (RMSI) or other system information (OSI).

4. The method of claim 1, wherein the second reference signal received power threshold is based at least in part on a power capability of the UE.

5. The method of claim 1, wherein receiving the synchronization signal block message comprises:
receiving the system information that indicates an offset that is used to determine the second reference signal received power threshold relative to the first reference signal received power threshold indicated by the system information.

6. The method of claim 1, further comprising:
determining an offset based at least in part on a random access request format, a random access request frequency range, a random access frequency band, a subcarrier spacing associated with the random access request, or a combination thereof, wherein the second reference signal received power threshold is determined relative to the first reference signal received power threshold using the determined offset.

7. The method of claim 1, further comprising:
increasing the second reference signal received power threshold by an increment value in response to a failed access request.

8. The method of claim 7, further comprising:
determining the increment value based at least in part on the system information included in the synchronization signal block message, an operating frequency range, an operating frequency band, a subcarrier spacing, a random access channel format, or a combination thereof.

9. The method of claim 1, further comprising:
determining that the second reference signal received power threshold is different from a third reference signal received power threshold that is used to determine whether to transmit a repetition of a scheduled uplink transmission in response to the random access response.

10. The method of claim 1, further comprising:
determining that the first reference signal received power threshold is based at least in part on a random access request configuration.

11. The method of claim 1, further comprising:
determining that the first reference signal received power threshold corresponds to a first of a contention free random access procedure or a contention based random access procedure and that a different reference signal received power threshold is used for a second of the contention free random access procedure and the contention based random access procedure.

12. The method of claim 1, further comprising:
determining the second reference signal received power threshold based at least in part on a delay constraint for communications between the UE and the network entity, quality of service requirements between the UE and the network entity, a type of the UE, an application type, or a combination thereof.

13. The method of claim 1, further comprising:
determining the second reference signal received power threshold based at least in part on an operating frequency of the UE, a current random access channel occasion, or both.

14. The method of claim 1, wherein transmitting the set of repetitions of the random access request comprises:
transmitting a quantity of repetitions of the random access request that is based at least in part on a maximum transmission power of the UE, the quantity of prior failed random access requests, or both.

15. The method of claim 1, wherein transmitting the set of repetitions comprises:
transmitting the set of repetitions according to a condition based random access procedure, wherein the UE performs a contention free random access procedure using signaling separate from the synchronization signal block message.

16. A method for wireless communications at a network entity, comprising:
transmitting, to a user equipment (UE), a synchronization signal block message comprising system information, wherein the system information indicates a first reference signal received power threshold that is to be used, by the UE, for determining whether to transmit a set of repetitions of a random access request;
receiving, from the UE, the set of repetitions of the random access request based at least in part on transmitting the synchronization signal block message, wherein the first reference signal received power threshold is used for determining a second reference signal received power threshold to be used for determining to communicate the set of repetitions of the random access request, and wherein the second reference signal received power threshold is based at least in part on the first reference signal received power threshold and a quantity of failed random access requests prior to reception of the set of repetitions; and
transmitting, to the UE, a random access response that is based at least in part on the set of repetitions of the random access request received from the UE.

17. The method of claim 16, wherein the system information that indicates the first reference signal received power threshold is remaining minimum system information (RMSI) or other system information (OSI).

18. The method of claim 16, further comprising:
determining that the first reference signal received power threshold is different from the second reference signal received power threshold that is used to determine whether to transmit a repetition of a scheduled uplink transmission in response to the random access response.

19. The method of claim 16, further comprising:
determining that the first reference signal received power threshold is based at least in part on a random access request configuration.

20. The method of claim 16, further comprising:
determining that the first reference signal received power threshold corresponds to a first of a contention free random access procedure or a contention based random access procedure and that a different reference signal received power threshold is used for a second of the contention free random access procedure and the contention based random access procedure.

21. The method of claim 16, further comprising:
determining the first reference signal received power threshold based at least in part on a delay constraint for communications between the UE and the network entity, quality of service requirements between the UE and the network entity, a type of the UE, an application type, or a combination thereof.

22. The method of claim 16, wherein
the system information indicates an offset in addition to the first reference signal received power threshold, wherein the offset is used to determine the second reference signal received power threshold relative to the first reference signal received power threshold.

23. The method of claim 16, wherein transmitting the synchronization signal block message comprises:
transmitting the synchronization signal block message that indicates an increment value that the UE is to apply to the first reference signal received power threshold in response to a failed access request.

24. A user equipment (UE) for wireless communications, comprising:
one or more memories;
one or more processors; and
instructions stored in the one or more memories and executable by the one or more processors to cause the UE to:
receive, from a network entity, a synchronization signal block message comprising system information, wherein the system information indicates a first reference signal received power threshold;
transmit, to the network entity, a set of repetitions of a random access request based at least in part on a reference signal received power of the synchronization signal block message satisfying a second reference signal received power threshold, wherein the second reference signal received power threshold is based at least in part on the first reference signal received power threshold and a quantity of failed access requests prior to transmission of the set of repetitions of the random access request; and
monitor, based at least in part on transmitting the set of repetitions of the random access request, a resource of a downlink control channel for a random access response from the network entity.

25. A network entity for wireless communications, comprising:
one or more memories;
one or more processors; and
instructions stored in the one or more memories and executable by the one or more processors to cause the network entity to:
transmit, to a user equipment (UE), a synchronization signal block message comprising system information, wherein the system information indicates a first reference signal received power threshold that is to be used, by the UE, for determining whether to communicate a set of repetitions of a random access request;
receive, from the UE, the set of repetitions of the random access request based at least in part on transmitting the synchronization signal block message, wherein the first reference signal received power threshold is used for determining a second reference signal received power threshold to be used for determining to communicate the set of repetitions of the random access request, and wherein the second reference signal received power threshold is based at least in part on the first reference signal received power threshold and a quantity of failed random access requests prior to reception of the set of repetitions; and
transmit, to the UE, a random access response that is based at least in part on the set of repetitions of the random access request received from the UE.

* * * * *